(12) United States Patent
Usuba et al.

(10) Patent No.: US 6,614,754 B1
(45) Date of Patent: Sep. 2, 2003

(54) BI-DIRECTIONAL LINE SWITCHED RING NETWORK SYSTEM

(75) Inventors: Keiji Usuba, Yokohama (JP);
Masatoshi Takahashi, Yokohama (JP);
Mitsunobu Kimura, Fujisawa (JP);
Seigo Obayashi, Yokohama (JP);
Takashi Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/299,575

(22) Filed: Apr. 27, 1999

(30) Foreign Application Priority Data

Apr. 28, 1998 (JP) ............................................. 10-118460

(51) Int. Cl.[7] .............................................. G01R 31/08
(52) U.S. Cl. ...................................... 370/222; 370/223
(58) Field of Search .............................. 370/400, 85.12, 370/16, 1, 220, 216, 217, 225, 227, 228, 258, 222, 223, 224, 535

(56) References Cited

U.S. PATENT DOCUMENTS

| | | | | |
|---|---|---|---|---|
| 5,412,652 A | * | 5/1995 | Lu ........................... | 370/85.12 |
| 5,537,393 A | * | 7/1996 | Shioda et al. ............... | 370/16.1 |
| 5,815,490 A | * | 9/1998 | Lu .............................. | 370/223 |
| 5,870,382 A | * | 2/1999 | Tounai et al. ................ | 370/220 |

OTHER PUBLICATIONS

ANSI, T1, 105.1 "SONET Automatic Protection Switching", dated 1991, pp. 13–17, 21, & 44 (Note: IDS Ref#E4466).*

"SONET BLSR Equipment Generic Criteri, Overview of the BLSR Architecture". GR–1230–CORE, Issue 3, Dec., 1996, Bell Communications Research Inc. pp. 3–1 to 3–24, 6–3, and 6–15 to 6–20 (Note: IDS Ref#E4466).*

* cited by examiner

Primary Examiner—Dang Ton
Assistant Examiner—Robert W. Wilson
(74) Attorney, Agent, or Firm—Antonelli, Terry, Stout & Kraus, LLP

(57) ABSTRACT

A bi-directional line switched ring network system including a plurality of optical fiber communications lines and a plurality of nodes connected by the plurality of optical fiber communications lines forming a closed circuit. Each of the nodes performs an addition and a drop of a path between an external communications apparatus and the optical fiber communications lines or permits the path on the optical fiber communications lines to pass through, or performs a change of a direction of the path. A control unit is located in each of the nodes to control the addition, the drop, the pass-through and the direction change of the path. When the path passes through each of the nodes, the control unit sets a time slot number of the path in being inputted into the node and a time slot number of the path in being outputted from the node independently of each other.

22 Claims, 27 Drawing Sheets

FIG. 7

- WORKING CHANNEL TIME SLOT #2 ADD
- SQUELCH (INSERTION OF AIS) — NODE C
- NODE A — NODE B — NODE C
- BLSR 10
- PROTECTION CHANNEL TIME SLOT #2
- NODE F — NODE E — NODE D
- DROP (ERROR)
- WORKING CHANNEL TIME SLOT #2
- SQUELCH (INSERTION OF AIS)

FIG. 8

| TIME SLOT No. | ← West | | NODES | | | East → | |
|---|---|---|---|---|---|---|---|
| | A | B | C | D | E | F | A |
| #1 | | | | 1PCF | | | |
| #2 : | | 2PBD | | | | 2PDF | |

FIG. 9

RING TOPOLOGY MAP

|   | NODE |
|---|------|
| 1 | B |
| 2 | C |
| 3 | D |
| 4 | E |
| 5 | F |
| 6 | A |

STS SQUELCH MAPS

FIG. 10(a)

| TIME SLOT No. | NODE A | | | |
|---|---|---|---|---|
| | West | | East | |
| | Outgoing Dst | Incoming Src | Outgoing Dst | Incoming Src |
| #1 | | | | |
| #2 ⋮ | | | | |

FIG. 10(b)

| TIME SLOT No. | NODE B | | | |
|---|---|---|---|---|
| | West | | East | |
| | Outgoing Dst | Incoming Src | Outgoing Dst | Incoming Src |
| #1 | | | | |
| #2 ⋮ | | | D | |

FIG. 10(c)

| TIME SLOT No. | NODE C | | | |
|---|---|---|---|---|
| | West | | East | |
| | Outgoing Dst | Incoming Src | Outgoing Dst | Incoming Src |
| #1 | | | F | |
| #2 ⋮ | | B | D | |

FIG. 10(d)

| TIME SLOT No. | NODE D | | | |
|---|---|---|---|---|
| | West | | East | |
| | Outgoing Dst | Incoming Src | Outgoing Dst | Incoming Src |
| #1 | | C | F | |
| #2 ⋮ | | B | F | |

FIG. 10(e)

| TIME SLOT No. | NODE E | | | |
|---|---|---|---|---|
| | West | | East | |
| | Outgoing Dst | Incoming Src | Outgoing Dst | Incoming Src |
| #1 | | C | F | |
| #2 ⋮ | | D | F | |

FIG. 10(f)

| TIME SLOT No. | NODE F | | | |
|---|---|---|---|---|
| | West | | East | |
| | Outgoing Dst | Incoming Src | Outgoing Dst | Incoming Src |
| #1 | | C | | |
| #2 ⋮ | | D | | |

FIG. 11

| TIME SLOT No. | ← West      NODES      East → |
|---|---|
| | A   B   C   D   E   F   A |
| #1 | 1PAC ──→     ──→ |
| #2 |                1PDF |
| #3 |    2PBD ──→ |
| #4 |         3PCE |
| ⋮ | |

FIG. 12

| TIME SLOT No. | ← West      NODES      East → |
|---|---|
| | A   B   C   D   E   F   A |
| #1 | 1PAC ──→     ──→ |
| #2 |                1PDF |
| #3 |    2PBD ──→   3PCE |
| #4 |    4PAE ─────────→ |
| ⋮ | |

FIG. 23A

| | | | TIME SLOT No. | BET-WEEN A AND F | BET-WEEN F AND E | BET-WEEN E AND D | BET-WEEN D AND C | BET-WEEN C AND B | BET-WEEN B AND A |
|---|---|---|---|---|---|---|---|---|---|
| NODE A | West | Out-going | #1 | — | — | — | — | — | — |
| | | | #2 | — | — | — | — | — | — |
| | | | #3 ⋮ | — | — | — | — | — | — |
| | | In-coming | #1 | — | — | — | — | — | — |
| | | | #2 | — | — | — | — | — | — |
| | | | #3 ⋮ | — | — | — | — | — | — |

FIG. 23B

| | | | TIME SLOT No. | BET-WEEN A AND B | BET-WEEN B AND C | BET-WEEN C AND D | BET-WEEN D AND E | BET-WEEN E AND F | BET-WEEN F AND A |
|---|---|---|---|---|---|---|---|---|---|
| NODE A | East | Out-going | #1 | — | — | — | — | — | — |
| | | | #2 | — | — | — | — | — | — |
| | | | #3 ⋮ | — | — | — | — | — | — |
| | | In-coming | #1 | — | — | — | — | — | — |
| | | | #2 | — | — | — | — | — | — |
| | | | #3 ⋮ | — | — | — | — | — | — |

FIG. 24A

| | | TIME SLOT No. | BET-WEEN B AND A | BET-WEEN A AND F | BET-WEEN F AND E | BET-WEEN E AND D | BET-WEEN D AND C | BET-WEEN C AND B |
|---|---|---|---|---|---|---|---|---|
| NODE B | West Out-going | #1 | — | — | — | — | — | — |
| | | #2 | — | — | — | — | — | — |
| | | #3 ⋮ | — | — | — | — | — | — |
| | West In-coming | #1 | — | — | — | — | — | — |
| | | #2 | — | — | — | — | — | — |
| | | #3 ⋮ | — | — | — | — | — | — |

FIG. 24B

| | | TIME SLOT No. | BET-WEEN B AND C | BET-WEEN C AND D | BET-WEEN D AND E | BET-WEEN E AND F | BET-WEEN F AND A | BET-WEEN A AND B |
|---|---|---|---|---|---|---|---|---|
| NODE B | East Out-going | #1 | #1 | #3 | — | — | — | — |
| | | #2 | — | — | — | — | — | — |
| | | #3 ⋮ | — | — | — | — | — | — |
| | East In-coming | #1 | — | — | — | — | — | — |
| | | #2 | — | — | — | — | — | — |
| | | #3 ⋮ | — | — | — | — | — | — |

FIG. 25A

| NODE C | West | | TIME SLOT No. | BET- WEEN C AND B | BET- WEEN B AND A | BET- WEEN A AND F | BET- WEEN F AND E | BET- WEEN E AND D | BET- WEEN D AND C |
|---|---|---|---|---|---|---|---|---|---|
| | | Out- going | #1 | — | — | — | — | — | — |
| | | | #2 | — | — | — | — | — | — |
| | | | #3 | — | — | — | — | — | — |
| | | | ⋮ | | | | | | |
| | | In- coming | #1 | #1 | — | — | — | — | — |
| | | | #2 | — | — | — | — | — | — |
| | | | #3 | — | — | — | — | — | — |
| | | | ⋮ | | | | | | |

FIG. 25B

| NODE C | East | | TIME SLOT No. | BET- WEEN C AND D | BET- WEEN D AND E | BET- WEEN E AND F | BET- WEEN F AND A | BET- WEEN A AND B | BET- WEEN B AND C |
|---|---|---|---|---|---|---|---|---|---|
| | | Out- going | #1 | #1 | #2 | #3 | — | — | — |
| | | | #2 | — | — | — | — | — | — |
| | | | #3 | #3 | 30 | — | — | — | — |
| | | | ⋮ | | 31 | | | | |
| | | In- coming | #1 | #1 | #2 | #3 | — | — | — |
| | | | #2 | — | — | — | — | — | — |
| | | | #3 | — | — | — | — | — | — |
| | | | ⋮ | | | | | | |

FIG. 26A

| | | TIME SLOT No. | BET-WEEN D AND C | BET-WEEN C AND B | BET-WEEN B AND A | BET-WEEN A AND F | BET-WEEN F AND E | BET-WEEN E AND D |
|---|---|---|---|---|---|---|---|---|
| NODE D | West Out-going | #1 | #1 | — | — | — | — | — |
| | | #2 | — | — | — | — | — | — |
| | | #3 | — | — | — | — | — | — |
| | | ⋮ | | | | | | |
| | West In-coming | #1 | #1 | — | — | — | — | — |
| | | #2 | — | — | — | — | — | — |
| | | #3 | #3 | #1 | — | — | — | — |
| | | ⋮ | | | | | | |

FIG. 26B

| | | TIME SLOT No. | BET-WEEN D AND E | BET-WEEN E AND F | BET-WEEN F AND A | BET-WEEN A AND B | BET-WEEN B AND C | BET-WEEN C AND D |
|---|---|---|---|---|---|---|---|---|
| NODE D | East Out-going | #1 | — | — | — | — | — | — |
| | | #2 | #2 | #3 | — | — | — | — |
| | | #3 | #3 | #2 | — | — | — | — |
| | | ⋮ | | | | | | |
| | East In-coming | #1 | — | — | — | — | — | — |
| | | #2 | #2 | #3 | — | — | — | — |
| | | #3 | — | — | — | — | — | — |
| | | ⋮ | | | | | | |

FIG. 27A

| | | TIME SLOT No. | BET- WEEN E AND D | BET- WEEN D AND C | BET- WEEN C AND B | BET- WEEN B AND A | BET- WEEN A AND F | BET- WEEN F AND E |
|---|---|---|---|---|---|---|---|---|
| NODE E | West | Out- going | #1 | — | — | — | — | — | — |
| | | | #2 | #2 | #1 | — | — | — | — |
| | | | #3 | — | — | — | — | — | — |
| | | | ⋮ | | | | | | |
| | | In- coming | #1 | — | — | — | — | — | — |
| | | | #2 | #2 | #1 | — | — | — | — |
| | | | #3 | #3 | — (33, 34) | — | — | — | — |
| | | | ⋮ | | | | | | |

FIG. 27B

| | | TIME SLOT No. | BET- WEEN E AND F | BET- WEEN F AND A | BET- WEEN A AND B | BET- WEEN B AND C | BET- WEEN C AND D | BET- WEEN D AND E |
|---|---|---|---|---|---|---|---|---|
| NODE E | East | Out- going | #1 | — | — | — | — | — | — |
| | | | #2 | #2 | — | — | — | — | — |
| | | | #3 | #3 | — | — | — | — | — |
| | | | ⋮ | | | | | | |
| | | In- coming | #1 | — | — | — | — | — | — |
| | | | #2 | — | — | — | — | — | — |
| | | | #3 | #3 | — | — | — | — | — |
| | | | ⋮ | | | | | | |

FIG. 28A

| | | TIME SLOT No. | BET-WEEN F AND E | BET-WEEN E AND D | BET-WEEN D AND C | BET-WEEN C AND B | BET-WEEN B AND A | BET-WEEN A AND F |
|---|---|---|---|---|---|---|---|---|
| NODE F | West | Out-going #1 | — | — | — | — | — | — |
| | | #2 | — | — | — | — | — | — |
| | | #3 | #3 | #2 | #1 | — | — | — |
| | | ⋮ | | | | | | |
| | | In-coming #1 | — | — | — | — | — | — |
| | | #2 | #2 | #3 | — | — | — | — |
| | | #3 | #3 | #2 | #1 | — | — | — |
| | | ⋮ | | | | | | |

FIG. 28B

| | | TIME SLOT No. | BET-WEEN F AND A | BET-WEEN A AND B | BET-WEEN B AND C | BET-WEEN C AND D | BET-WEEN D AND E | BET-WEEN E AND F |
|---|---|---|---|---|---|---|---|---|
| NODE F | East | Out-going #1 | — | — | — | — | — | — |
| | | #2 | — | — | — | — | — | — |
| | | #3 | — | — | — | — | — | — |
| | | ⋮ | | | | | | |
| | | In-coming #1 | — | — | — | — | — | — |
| | | #2 | — | — | — | — | — | — |
| | | #3 | — | — | — | — | — | — |
| | | ⋮ | | | | | | |

BI-DIRECTIONAL LINE SWITCHED RING NETWORK SYSTEM

BACKGROUND OF THE INVENTION

The present invention relates to a BLSR (bi-directional line switched ring) network of a SONET (Synchronous Optical Network), and more particularly to a BLSR network system having characteristics in the slot control.

In the Ring network, transfer of traffic is performed in a frame unit called, for example, a STS-1 (Synchronous Transport Signal-1). These frames are time-division multiplexed into a predetermined position of the time slot, then being transmitted. At present, as described in "SONET Automatic Protection Switching", ANSI (American National Standards Institute, Inc.), T1.105.01, there exist a 2-Fiber BLSR and a 4-Fiber BLSR as the BLSR network.

Concerning overview of the BLSR network, the description thereof is given in, for example, "SONET BLSR Equipment Generic Criteria, Overview of the BLSR Architecture", GR-1230-CORE, Issue Dec. 3, 1996, Bell Communications Research Inc., pp. 3-1 to 3-24, 6-3, and 6-15 to 6-20.

In the 2-Fiber BLSR, the respective nodes are connected by two optical fibers, and a capacity within the respective channels is divided into two areas and the one is used for a working function and the other is used for a protecting function. In contrast to this, the 4-Fiber BLSR is configured in such a manner that there are provided working channels and protection channels and the respective nodes are connected by four optical fibers.

Both of the 2-Fiber BLSR and the 4-Fiber BLSR are systems in which under normal conditions, the traffic is transmitted using the working channel, and when there occurs a failure or the like, the traffic is protected using the protection channel. Hereinafter, taking as an example a 4-Fiber BLSR of an OC (Optical Carrier)-48, the explanation will be presented. Also, hereinafter, the traffic is described as "path".

FIG. 1 shows a configuration example of the BLSR network and an examples of use of the channels. In FIG. 1, reference numeral 10 denotes the entire system of the BLSR network. The BLSR network 10 includes optical fiber transmission lines 11 having a high signal transmission rate of, for example, 2.4 to 10 Gbits/sec and a plurality of nodes 12. The BLSR network illustrated in FIG. 1 includes six nodes (nodes A, B, C, D, E, and F).

With two fibers provided for each of the directions in the signal transmission, the optical fiber transmission lines 11 consist of bi-directionally four optical fibers. Concretely speaking, the optical fiber transmission lines 11 include a CW direction (i.e. a clockwise direction in the drawing) of working channel 13 and a CW direction of protection channel 14, and a CCW direction (i.e. a counterclockwise direction) of working channel 15 and a CCW direction of protection channel 16.

The plurality of nodes 12 are inserted into the optical fiber transmission lines 11 with a span placed therebetween. Each of the nodes 12 houses a lower-level network element (omitted in, the drawing) having a low signal transmission rate of, for example, 150 Mbits/sec or 600 Mbits/sec. The each of the nodes 12 performs an addition or a drop of the path (the STS-1) in the respective channels between the lower-level network element belonging thereto and the optical fiber transmission lines 11. Accordingly, the nodes 12 are also referred to as ADMs (Add Drop Multiplexers).

The example illustrated in FIG. 1 indicates that the STS-1 path, which is added at the node C and passes through the nodes D, E and is dropped at the node F, is transmitted using a time slot number #1 of the CW direction of working channel 13.

In the BLSR network system in FIG. 1, when there occurs a failure on only the working channel between, for instance, the node D and the node E, a path that is trying to pass through the failed span is transmitted using the protection channel. FIG. 2 shows a configuration in this situation.

In FIG. 2, when there takes place a failure on the working channel 13 between the node D and the node E, the node D and the node E switch the path, which is contained in the time slot number #1 that has been transmitted by the working channel 13, so that the path will be transmitted using a time slot number #1 of the protection channel 14. This switching illustrated in FIG. 2 is referred to as "Span Switching".

Also, in the BLSR network system in FIG. 1, when there take place failures on both of the working channel 13 and the protection channel 14 between the node D and the node E, the path that is trying to pass through the failed span, as illustrated in FIG. 3, is caused to be looped at the node D back to the counterclockwise direction of protection channel 16.

As illustrated in FIG. 3, when there take place the failures on both of the working channel 13 and the protection channel 14 between the node D and the node E, the node D loops and switches the path, which is contained in the time slot number #1 that has been transmitted by the working channel 13, so that the path will be transmitted in the counterclockwise direction using a time slot number #1 of the protection channel 16. At this time, the nodes C, B, A and F permit the time slot number of the protection channel 16 to pass through without interchanging it.

In the node E, the path is caused to be transferred from the time slot number #1 that has been transmitted by the protection channel 16 to the time slot number#1 of the CW direction of working channel 13. Then, the path is dropped at the node F. The switching performed at the node D or the node E in FIG. 3 is referred to as "Ring Switching".

As is seen from the above-mentioned description, it is the nodes at the both ends of a failed channel (in the examples in FIG. 2 and FIG. 3, the node D and the node E) that execute the Span Switching or the Ring Switching. Also, as illustrated in FIG. 3, when the Ring Switching is executed, the nodes A, B, C and F enter a Full Pass Through state in which they permit the protection channel and K-byte, i.e. switching control information, to pass through.

Next, the explanation will be given below regarding a configuration of the nodes. FIG. 4 illustrates a configuration of the node 12. Since all the nodes on the BLSR network are of the same configuration, the configuration of any one node is illustrated as a representative. As described earlier, the node 12 is referred to as the ADM (Add Drop Multiplexer). In the FIG. 4, the node 12 leads in the following: The four channels as Fiber Channels (channels for the Ring), i.e. the CW direction of working channel 13, the CW direction of protection channel 14, the CCW direction of working channel 15 and the CCW direction of protection channel 16, and an Add Channel 27 for adding path transmitted from the lower-level network element 12-1, and a Drop Channel 28 for dropping path so as to output it to the lower-level network element 12-1.

An optical signals inputted from another node is received by an optical receiver (R) 21, and is inputted into an overhead processing unit 23 so as to undergo an overhead processing. The path the overhead of which has been removed is then inputted into a cross connect unit 20. The cross connect unit 20 performs a TSI (Time Slot Interchange) and a TSA (Time Slot Assignment) of the high rate-side path (the OC-48) and the low rate-side path (the STS-1), and the path inputted therein is divided into the respective directions in the frame unit of the STS-1.

The paths thus divided are each multiplexed, and undergo the overhead processing at the overhead processing unit 23, and are converted into optical signals by an optical transmitter (T) 22, then being outputted from any one of the CW direction of working channel 13, the CW direction of protection channel 14, the CCW direction of working channel 15, the CCW direction of protection channel 16 and the Drop Channel 28.

For instance, in the configuration illustrated in FIG. 1, the STS-1 path is added at the node C from the lower-level network element 12-1 through the Add Channel 27 illustrated in FIG. 4. "Then, the STS-1 path is divided into the CW direction of working channel 13, i.e. an transmission line toward the node D, at the cross connect unit 20 through the overhead processing unit 23, and is multiplexed into a position of the time slot number #1, then being outputted.

Also, in accordance with an instruction from an OS (Operation System), i.e. an apparatus for controlling the entire system and a state of a transmission line such as a fiber interruption, a path switching control unit 25 illustrated in FIG. 4 determines whether or not the Span Switching or the Ring Switching is executed, then informing the cross connect unit 20 of the switching command. Receiving the switching command from the path switching control unit 25, the cross connect unit 20 performs a switching of the path in correspondence with the type of the switching command such as the Ring Switching, the Span Switching or the Full Pass Through.

Next, the explanation will be given below concerning a channel misconnection. In the network illustrated in FIG. 1, when there occurs a node failure at the node D as is indicated by a mark X in FIG. 5, the path, which is contained in the time slot number #1 from the node C to the node F illustrated in FIG. 1, is caused to be transferred to the protection channel 16 at the node C. Then, the path passes through the nodes B, A and F using the time slot number #1 of the CCW direction of protection channel 16. Moreover, the path is looped back at the node E in the same way as the case in FIG. 3 and is caused to be transferred to the CW direction of working channel #1, then being dropped at the node F. At this time, the Ring Switching has been executed at the node C and the node E.

FIG. 6 shows another example of use of the channels in the BLSR network illustrated in FIG. 1. The example in FIG. 6 indicates the following: A path, which is added at the node B and passes through the node C and is dropped at the node D, and a path, which is added at the node D and passes through the node E and is dropped at the node F, are both transmitted using a time slot number #2.

In the channel setting state in FIG. 6, if there occurs a node failure, at the node D as is the case with FIG. 5, connections of, the time slots are performed in the same way as the case in FIG. 5. This results in the following situation illustrated in FIG. 7: The path added at the node B is caused to be transferred to the protection channel 16 at th!e node C. Then, the path passes through the nodes B, A and F using the time slot number #2 of the CCW direction of protection channel 16. Moreover, the path is looped back at the node E and is caused to be transferred to the CW direction of working channel #2, then being dropped at the node F.

As a result, it turns out that the path dropped at the node F has been incorrectly connected with the path added at the node B. This means that there has occurred a misconnection of the path. In order to prevent the misconnection like this, the ANSI stipulates performing an operation of inserting a path AIS (Alarm Indication Signal) into a designated position within the path at the node C and the node E in FIG. 7 at which the Ring Switching is executed. The operation of inserting the path AIS is referred to as "Squelch".

FIG. 8 shows a transfer diagram of the paths at the time when the examples of use of the channels in FIG. 1 and FIG. 6 exist simultaneously. The rear end of an arrow indicates a node at which a path is added, and the arrowhead indicates a node at which the path is dropped. In FIG. 8, a path $1P_{CF}$ denotes the STS-1 path in FIG. 1, and paths $2P_{BD}$ and $2P_{DF}$ denote the two STS-1 paths in FIG. 6, respectively.

According to the ANSI, for the Squelch operation, each of the nodes holds the following two types of maps: A Ring Topology Map indicating an order of the node IDs within the Ring and a STS Squelch Map indicating at which node a path, which passes through a present node or is added or dropped at the present node, is added and at which node the path is dropped.

Figure 9:
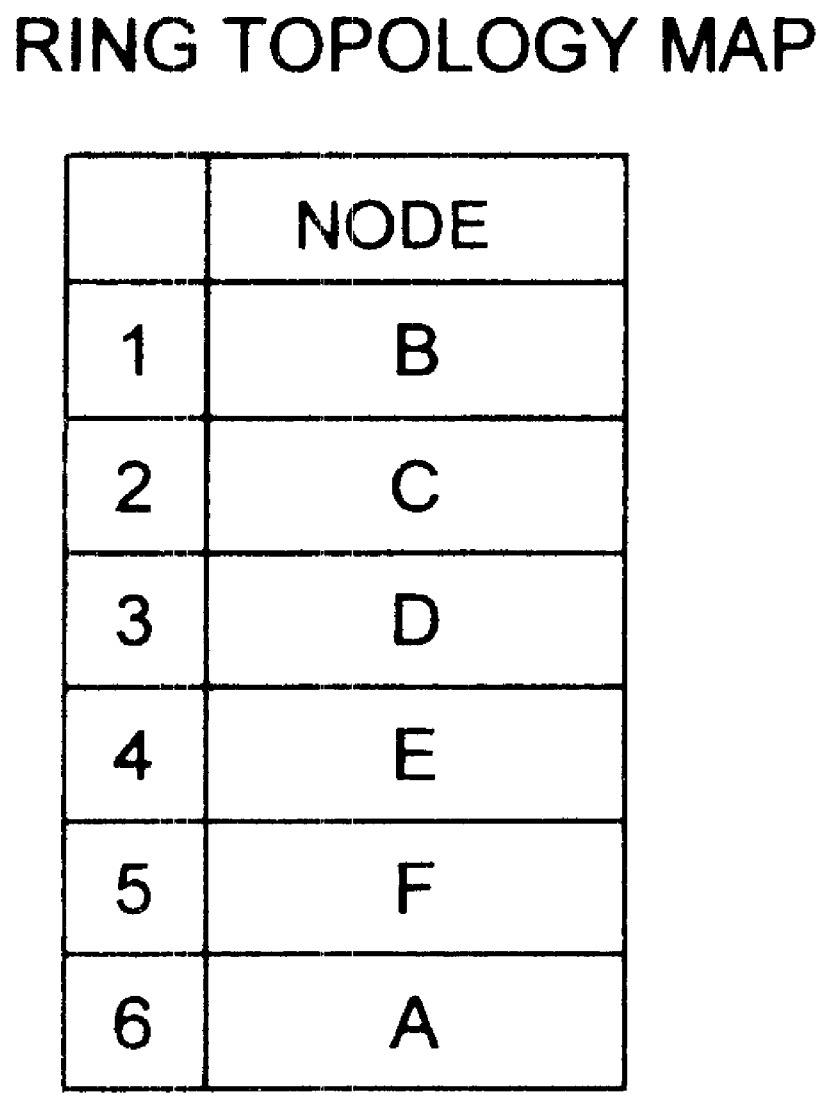

FIG. 9 shows an example of the Ring Topology Map of the BLSR network in FIG. 1. FIG. 9 indicates that, within the BLSR network, the nodes are located in the CW direction in the order of B, C, D, E, F, A. Although the 6 nodes are described in FIG. 9, the number of the nodes up to 16 is allowed in the BLSR network.

FIGS. 10(*a*)–(*f*) show examples of the STS Squelch Maps that each of the nodes A, B, C, D, E, and F holds when the channel setting is presented as illustrated in FIG. 1 and FIG. 6. In FIG. 10(*e*), for instance, the STS Squelch Map that the node E holds indicates that a path in a West side time slot number #1 is added at the node C and, similarly, a path in an East side time slot number #1 is dropped at the node F. The STS Squelch Map that the node E holds also indicates that a path in a West side time slot number #2 is added at the node D and a path in an East side time slot number #2 is dropped at the node F.

Next, the explanation will be given below regarding a method of executing the Squelch. For instance, as is shown in FIG. 5 and FIG. 7, when the node D falls in a state of a failure, the node C and the node E that are adjacent to the node D execute the Ring Switching. In the BLSR, the K-byte on a Line Overhead allows a Missing Node to be identified. The Missing Node is defined as a node that is disconnected when seen from a present node. Regarding the K-byte, refer to "SONET BLSR Equipment Generic Criteria, Overview of the BLSR Architecture", GR-1230-CORE, Issue 3, December 1996, Bell Communications Research Inc., pp. 6-15 to 6-20.

In the cases in FIG. 5 and FIG. 7, when seen from, for example, the node C and the node E, the Missing Node is the node D. In these cases, however, the source node (Src) of the path in the time slot number #1 is the node C. Accordingly, the Squelch is not executed at the node E, and the path is connected as is illustrated in FIG. 5.

Meanwhile, the source node of the path in the time slot number #2 is the node D, i.e. the Missing Node. For this reason, the misconnection will occur if the path is connected just the way it is without any transaction. Accordingly, the Squelch (the insertion of the path AIS) is executed as is illustrated in FIG. 7.

In the BLSR, it is impossible to execute an interchange of a time slot of a path passing through a node (the Time Slot Interchange: hereinafter described as the TSI). When, in FIG. 1, the channel setting from the node C to the node F is presented, the time slot cannot be changed at the node D and the node E through which the path passes. Thus, it turns out that the time slot #1 continues to be used on the BLSR. Similarly, in the example of the channel setting presented in FIG. 6, the time slot cannot be changed at the node C and the node E, and thus it turns out that the time slot #2 continues to be used.

In the above-described BLSR according to the prior arts, the TSI is not executed regarding the path passing through the high rate-side Ring network. Moreover, no provision has been given regarding a method of protecting a path at the time when a necessity for the switching occurs, i.e., for example, at the time of a failure in the case of supporting the TSI. Also, the STS Squelch Map that each node holds is based on, as the precondition, the case of not supporting the TSI in the BLSR, and thus the STS Squelch Maps cannot be enough information in the case of supporting the TSI.

SUMMARY OF THE INVENTION

The present invention can solve the above-described problems. It is an object of the invention to provide a BLSR network that allows a path, which passes through a node in the BLSR network, to change the time slot. Also, it is another object of the present invention to provide a method of protecting a path at the time when the switching occurs.

A bi-directional line switched ring network system according to the present invention includes a plurality of optical fiber communications lines, a plurality of nodes connected by a the plurality of optical fiber communications lines in such a manner as to form a closed circuit, each of the plurality of nodes performing an addition and a drop of a path between an external communications apparatus and the optical fiber communications lines, or permitting the path on the optical fiber communications lines to pass through, or performing a change of a direction of the path, and a control unit located in each of the plurality of nodes so as to control the addition the drop, the pass-through and the direction change of the path, wherein when the path passes through each of the nodes, the control unit sets a time slot number of the path in being inputted into the node and a time slot number of the path in being outputted from the node independently of each other.

A method of protecting a path in the bi-directional line switched ring network system according to the present invention includes the steps of setting, when a path passes through a node, a time slot number of the path in being inputted into the node and a time slot number of the path in being outputted from the node independently of each other, and when a failure occurs on one of working transmission lines between adjacent nodes (span), executing a span switching that allows a path to be maintained by using a protection transmission line the time slot number of which is the same as a time slot number of the working transmission line.

Further, a method of protecting a path in the bi-directional line switched ring network system according to the present invention includes the steps of setting, when a path passes through a node, a time slot number of the path in being inputted into the node and a time slot number of the path in being outputted from the node independently of each other, and when failures occur on all of transmission lines between adjacent nodes, executing a ring switching that allows a path to be maintained by using a protection transmission line which is provided with the same time slot number as that of a working transmission line between the adjacent nodes and the direction of which is opposite to a direction of the working transmission line.

Still further, a method of protecting a path in the bi-directional line switched ring network system according to the present invention includes the steps of setting, when a path passes through a node, a time slot number of the path in being inputted into the node and a time slot number of the path in being outputted from the node independently of each other, and when a failure occurs at one node, executing, at the other node connected with the failed node, a ring switching that allows a path to be transferred from a working transmission line or an external communications apparatus to a protection transmission line and by the ring switching, transferring the path to a protection transmission line which is provided with the same time slot number as a time slot number of a working transmission line between the connected nodes before the failure and the direction of which is opposite to a direction of the working transmission line, and executing, at the other node connected with the failed node, a ring switching that allows a path to be transferred from a protection transmission line to a working transmission line or an external communications apparatus, and by the ring switching, transferring the path with the time slot number of the protection transmission line.

In the embodiments of the present invention, in order to embody the above-mentioned operations, in association with a path to be received or transmitted on a working transmission line, the respective nodes, i.e. transmission units on the BLSR, hold a table indicating in sequence the time slot numbers used on the BLSR up to a transmission unit at which the path is terminated.

BRIEF DESCRIPTION OF THE DRAWINGS

FIG. 7 is a network configuration diagram illustrating an example of the Squelch executed at the time of a node failure in FIG. 6;

FIG. 8 is a path transfer diagram in the case in which the examples of the path setting in FIG. 1 and FIG. 6 coexist;

FIG. 9 shows the Ring Topology Map in FIG. 1;

FIGS. 10(a)–(f) show the STS Squelch Maps at the respective nodes in FIG. 1 and FIG. 6.

FIG. 11 is a path transfer diagram illustrating, as examples, paths set using the working channels;

FIG. 12 is a path transfer diagram illustrating examples of the path setting at the time of not supporting the TSI;

FIGS. 23A and 23B are configuration diagrams of a TSI table that the node A in FIG. 20 holds;

FIGS. 24A and 24B are configuration diagrams of a TSI table that the node B in FIG. 20 holds;

FIGS. 25A and 25B are configuration diagrams of a TSI table that the node C in FIG. 20 holds;

FIGS. 26A and 26B are configuration diagrams of a TSI table that the node D in FIG. 20 holds;

FIGS. 27A and 27B are configuration diagrams of a TSI table that the node E in FIG. 20 holds;

FIGS. 28A and 28B are configuration diagrams of a TSI table that the node F in FIG. 20 holds;

DETAILED DESCRIPTION OF THE EMBODIMENTS

Referring to the embodiments illustrated in the accompanying drawings, the concrete explanation will be given below regarding the present invention. First, the explanation will be given regarding the TSI in the BLSR. The TSI in the BLSR is a function of changing a time slot number of a path passing through a node on the Ring.

FIG. 11 shows an example of a transfer diagram of paths using the working channels. In FIG. 11, a time slot number #1 is used by two paths, i.e. a path $1P_{AC}$ added at the node A and dropped at the node C and a path $1P_{DF}$ added at the node D and dropped at the node F. Also, a time slot number #2 is used by a path $2P_{BD}$ added at the node B and dropped at the node D. Moreover, a time slot number #3 is used by a path $3P_{CE}$ added at the node C and dropped at the node E. Concerning these four paths, the TSI is not performed.

In the path transferring situation in FIG. 11, let's consider a case in which a path $P_{AE}$ added at the node A and dropped at the node E will be newly set.

According to the prior arts, in order to embody the path setting at this time, as illustrated in FIG. 12, it cannot be helped setting a path $4P_{AE}$, using a time slot number #4 that the other paths have not used on all the spans between the adjacent nodes from the node A to the node E. This is because, since the TSI is not supported in the prior arts, it is impossible to execute an interchange of time slots at a node through which the path passes.

In contrast to this, in the present invention, the TSI is supported. Consequently, if a time slot is vacant on a span between adjacent nodes, it is possible to interchange the time slots at the node through which the path passes.

Figure 13:
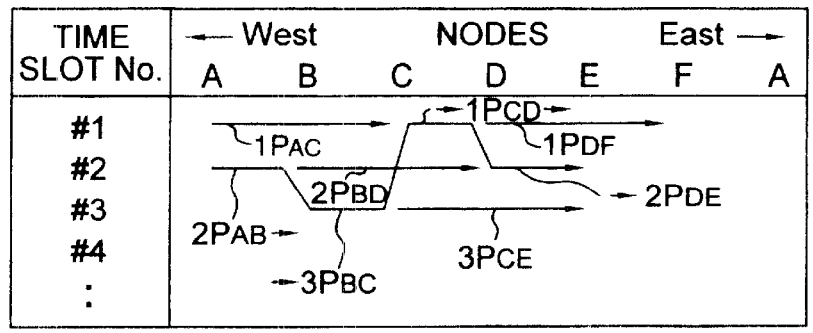
FIG. 13 is a path transfer diagram illustrating examples of the path setting according to the present invention at the time of supporting the TSI.

FIG. 13 shows an example of the path setting presented by the present invention when, as is the case with the above-described example, the path PAE added at the node A and dropped at the node E will be newly set in the path transferring situation in FIG. 11.

In FIG. 13, between the node A and the node B, a path $2P_{AB}$→is set using the time slot number #2, and between the node B and the node C, a path→$3P_{BC}$ is set using the time slot number #3, and between the node C and the node D, a path→$1P_{CD}$→is set using the time slot number #1, and between the node D and the node E, a path→$2P_{DE}$ is set using the time slot number #2, thus setting the four paths and thereby setting the above-described path PE added at the node A and dropped at the node E.

At this time, the TSI function performs the following interchanges of the time slots: An interchange from the time slot number #2 to #3 at the node B, an interchange from the time slot number #3 to #1 at the node C, and an interchange from the time slot number #1 to #2 at the node D. These interchanges eventually make it possible to set the path $P_{AE}$ from the node A to the node E without using the time slot number #4 needed in the prior arts and illustrated in FIG. 12, thus allowing the time slots to be used more effectively as compared with the case in FIG. 12.

Figure 14:
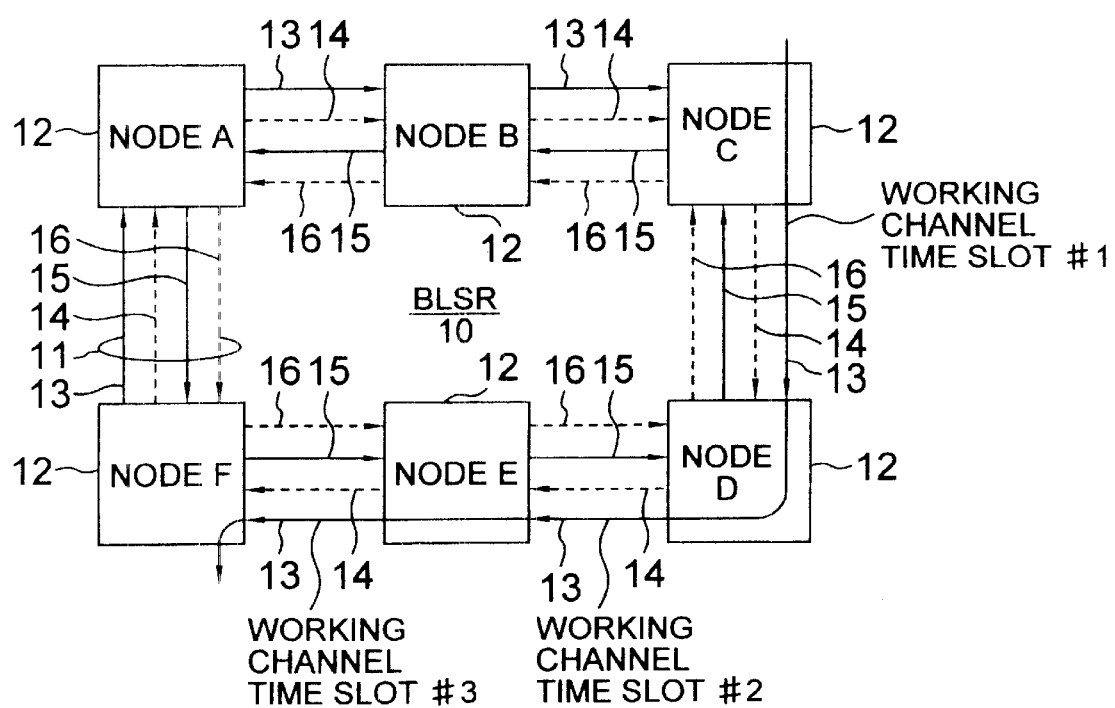
FIG. 14 shows an embodiment of configuration of the 4-Fiber BLSR network system according to the present invention and a network configuration diagram illustrating a first example of the path setting according to the present invention.

FIG. 14 shows an example of a path transfer in the BLSR network at the time of supporting the TSI according to the embodiment of the present invention. In FIG. 14, a path is added from the node C onto the BLSR, and then is transferred using a CW direction of working channel 13 and employing the time slot #1 between the node C and the node D, the time slot #2 between the node D and the node E, and the time slot #3 between the node E and the node F, respectively. Also, in FIG. 14, the time slot number is changed, from #1 to #2 at the node D, and the time slot number is changed from #2 to #3 at the node E.

Figure 1:
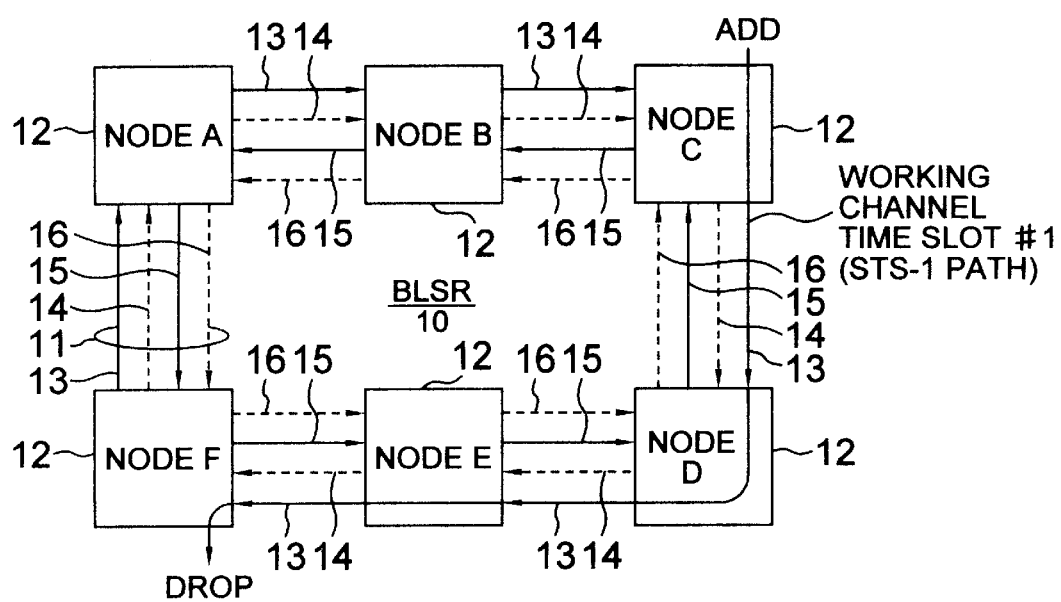
FIG. 1 shows a configuration example of the 4-Fiber BLSR network system and a network configuration diagram illustrating a first example of the path setting.
Figure 2:
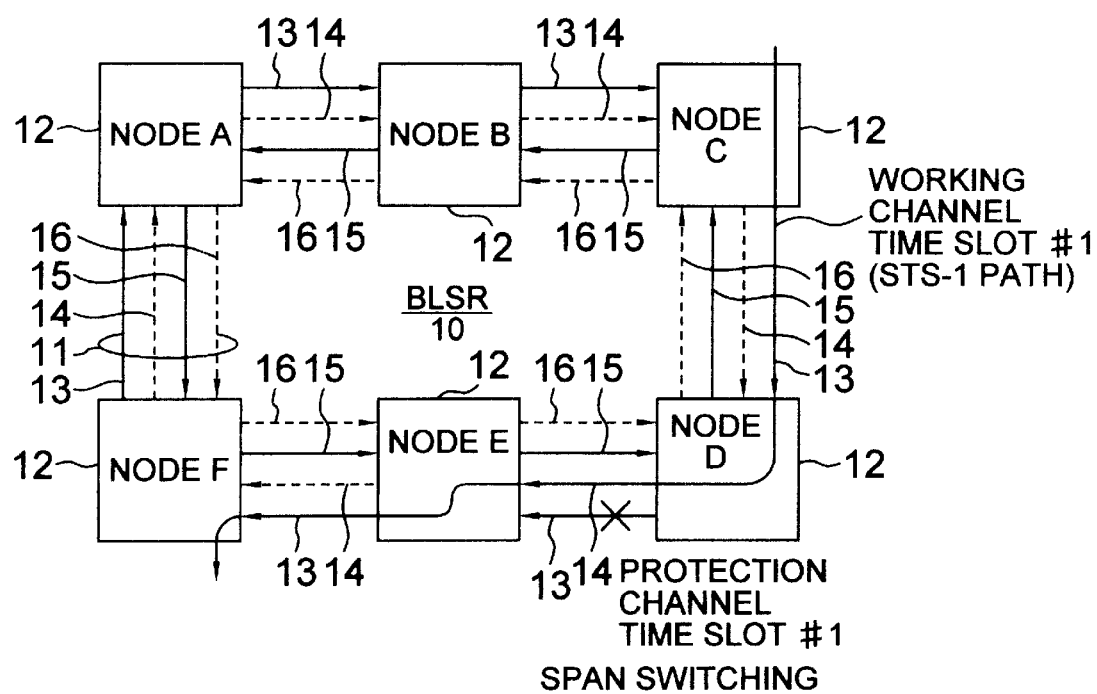
FIG. 2 is a network configuration diagram illustrating an example of the path protection performed by the Span Switching in FIG. 1.
Figure 3:
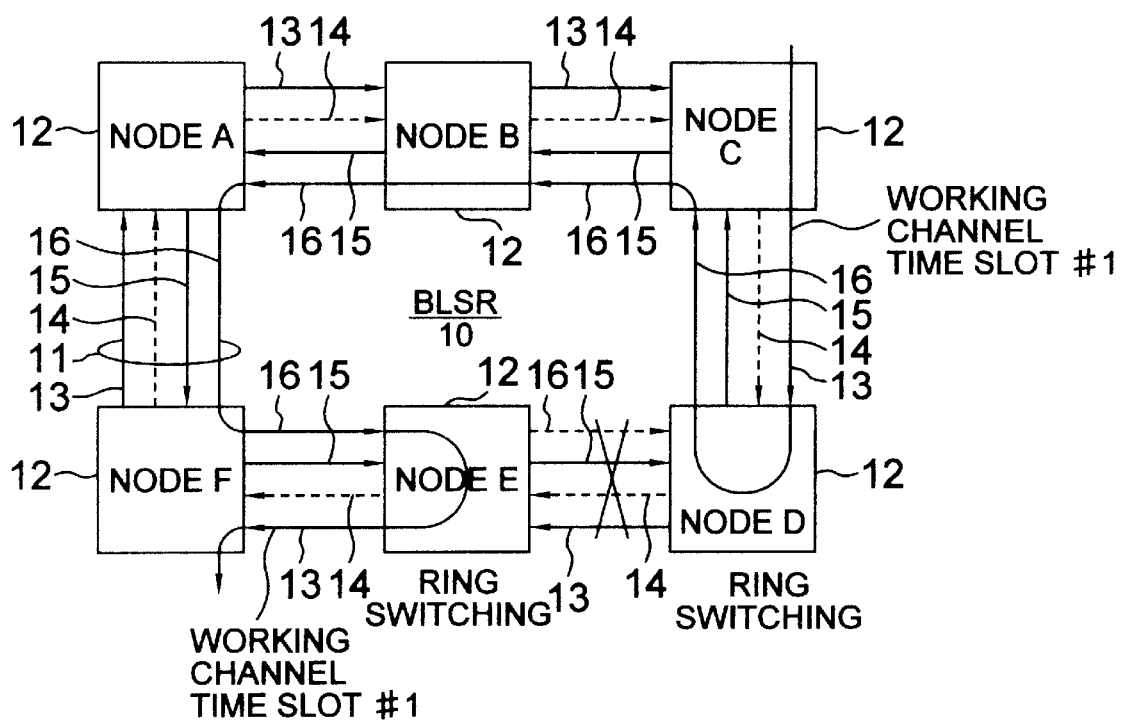
FIG. 3 is a network configuration diagram illustrating an example of the path protection performed by the Ring Switching in FIG. 1.
Figure 4:
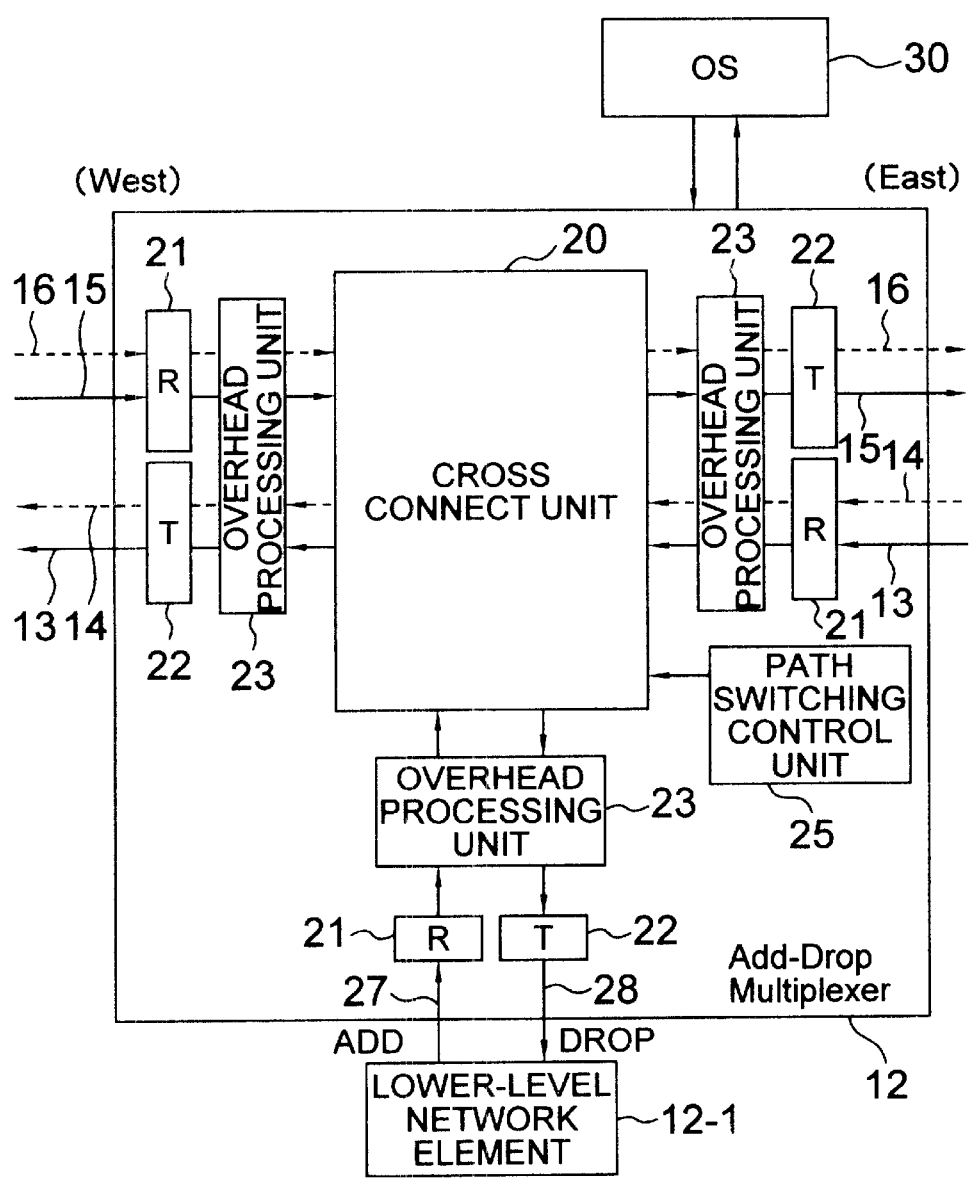
FIG. 4 is a block diagram illustrating a basic configuration of the node.
Figure 5:
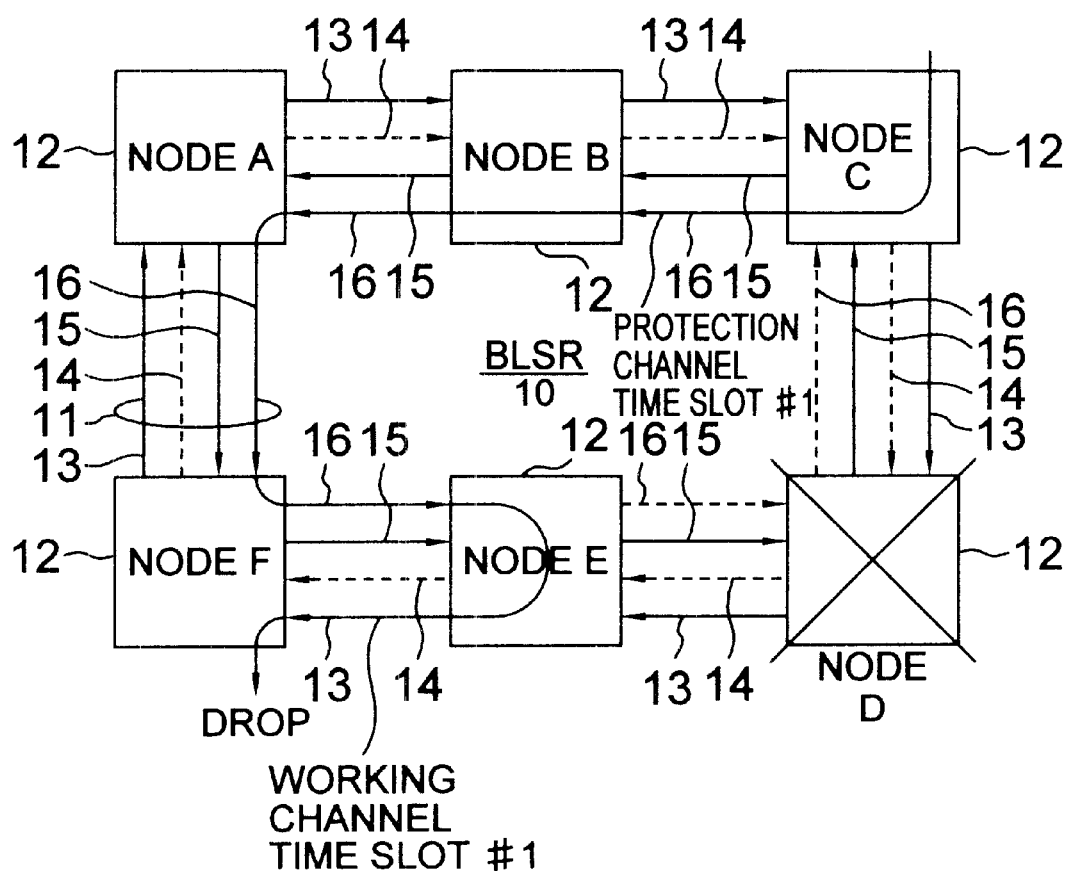
FIG. 5 is a network configuration diagram illustrating an example of the path protection performed by the Ring Switching at the time of a node failure in FIG. 1.
Figure 6:
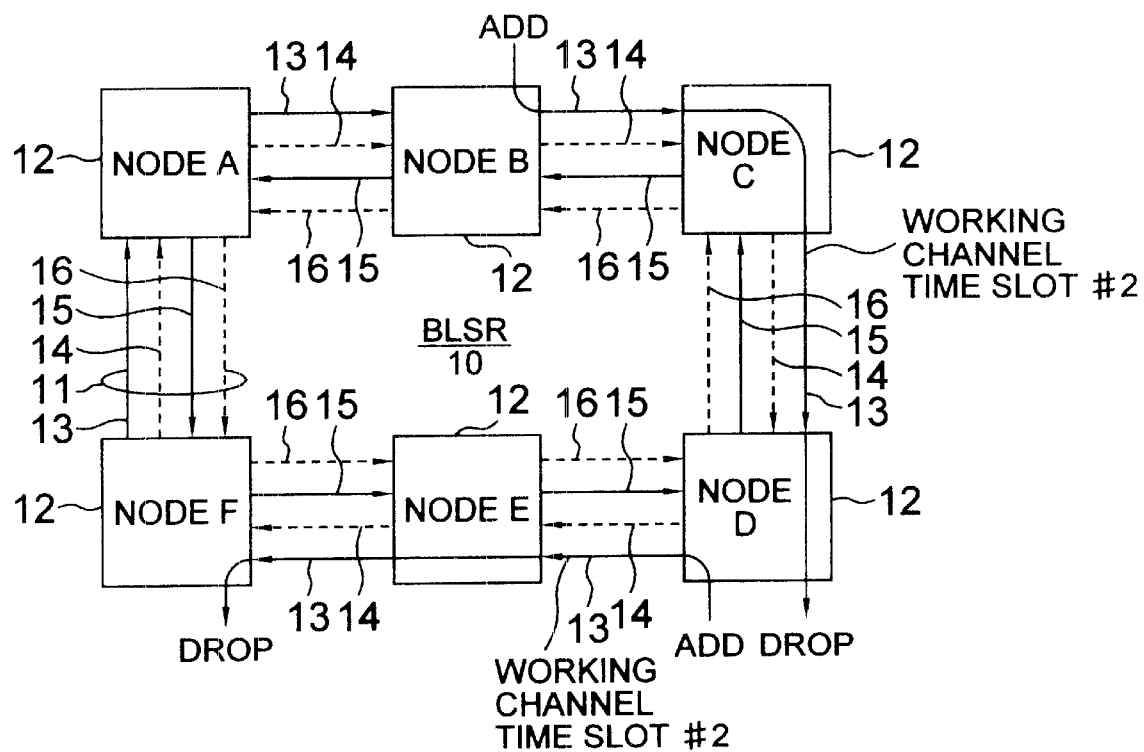
FIG. 6 shows a configuration example of the 4-Fiber BLSR network system according to the prior arts and a network configuration diagram illustrating a second example of the path setting.

Next, the explanation will be given concerning a method of protecting a path at the time when an occurrence of a failure organ instruction from the OS 30 (FIG. 4) starts up the Span Switching or the Ring Switching described in the ANSI, T1.105.01.

Figure 15:
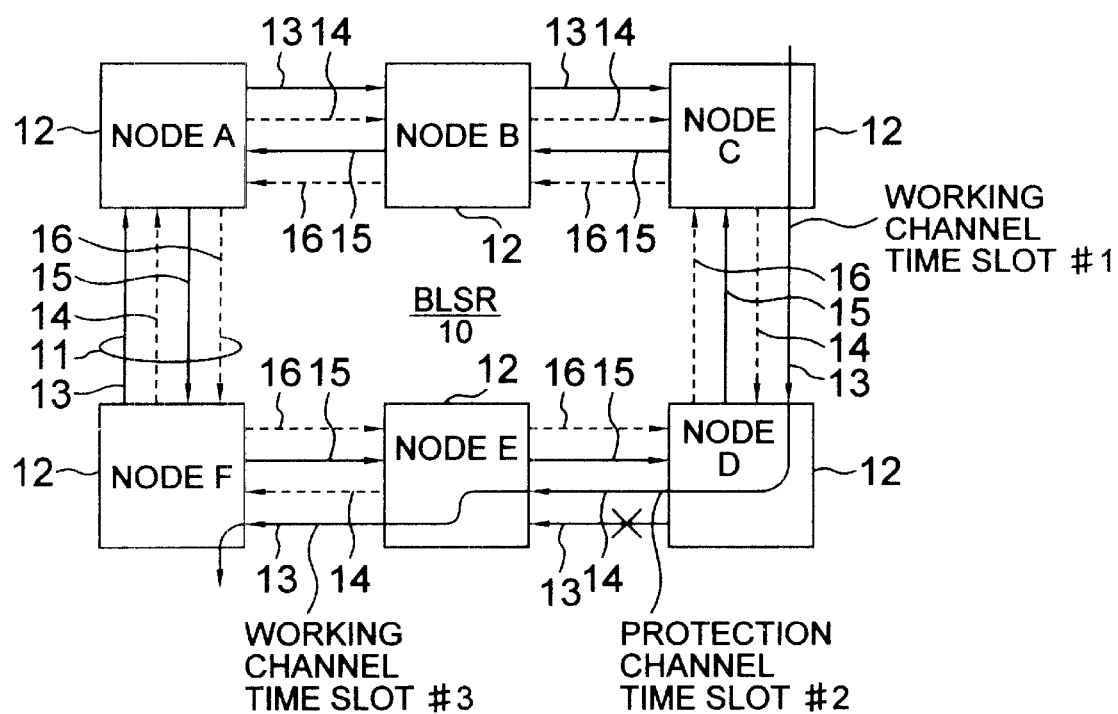
FIG. 15 is a network configuration diagram illustrating an example of the path protection performed by the Span Switching in FIG. 14.

FIG. 15 illustrates a method of protecting the path illustrated in FIG. 14, at the time when the Span Switching is started up between the node D and the node E. When the Span Switching is started up, protection of a path is executed using a protection transmission line 14 between the nodes on which the Span Switching is started up.

Also, the time slot number #2, which is used on the CW direction of working channel 13 in the normal state, is assigned to the path in FIG. 14. By the way, on the OC-48 (the optical carrier has a signal transmission rate of 2.4 Gbits/sec) BLSR, there exist 48 paths between the node D and the node E on the STS-1 basis. It is obvious that the Time Slot Assignment makes it possible to protect all the paths that use the working channel 13 in the normal state.

Figure 16:
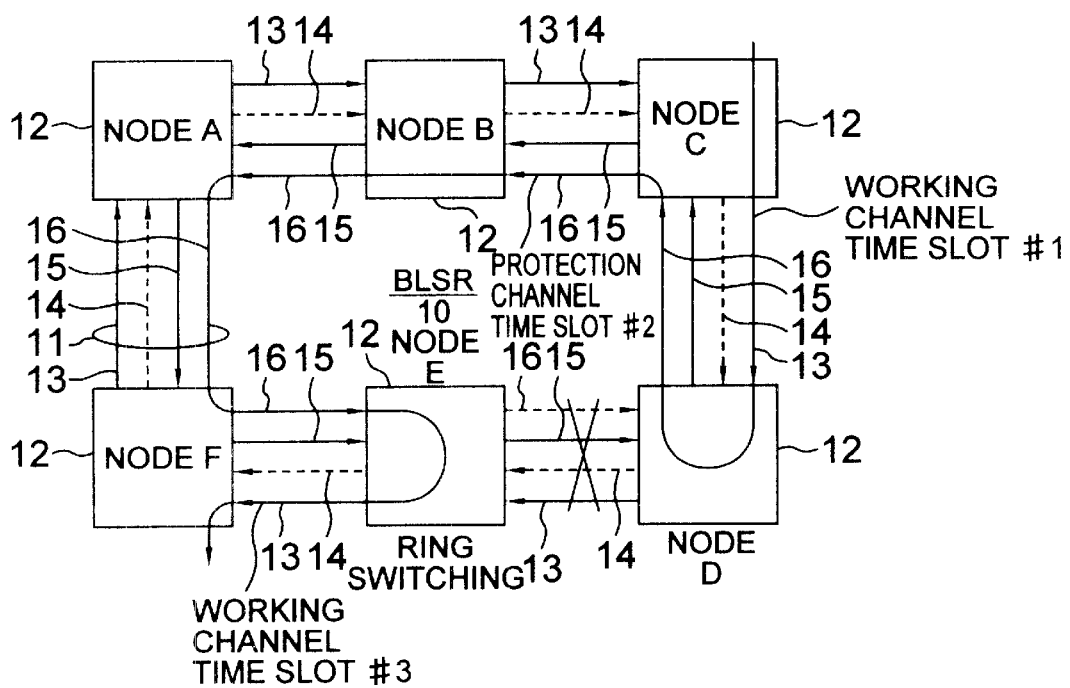
FIG. 16 is a network configuration diagram illustrating an example of the path protection performed by the Ring Switching in FIG. 14.

FIG. 16 shows a method of protecting the path illustrated in FIG. 14 at the time when the Ring Switching is started up between the node D and the node E. When the Ring Switching is started up, protection of a path is executed using a CCW direction of protection channel 16 the direction of which is opposite to that of the CW direction of working channel 13. Also, the time slot number #2, which is used on the CW direction of working channel 13 in the normal state, is assigned to the path in FIG. 14. Also, the nodes C, B, A and F, i.e. intermediate nodes other than the nodes D, E at which the Ring Switching is being executed, are in the Full Pass Through state defined in the ANSI, T1.105.01. Namely, the path having been inputted onto the CCW direction of protection channel 16 is outputted onto the CCW direction of protection channel 16 on the reverse side just the way it is without any interchange of the time slot thereof. Consequently, the path looped back at the node D is transferred up to the node E without any interchange of the time slot thereof. Moreover, at the node E, the path is looped back to the time slot number #3 of the CW direction of working channel 13, then being dropped at the node F. It is obvious that the Time Slot Assignment according to the present invention makes it possible to protect all the paths that use the working channel 13 between the node D and the node E.

Figure 17:
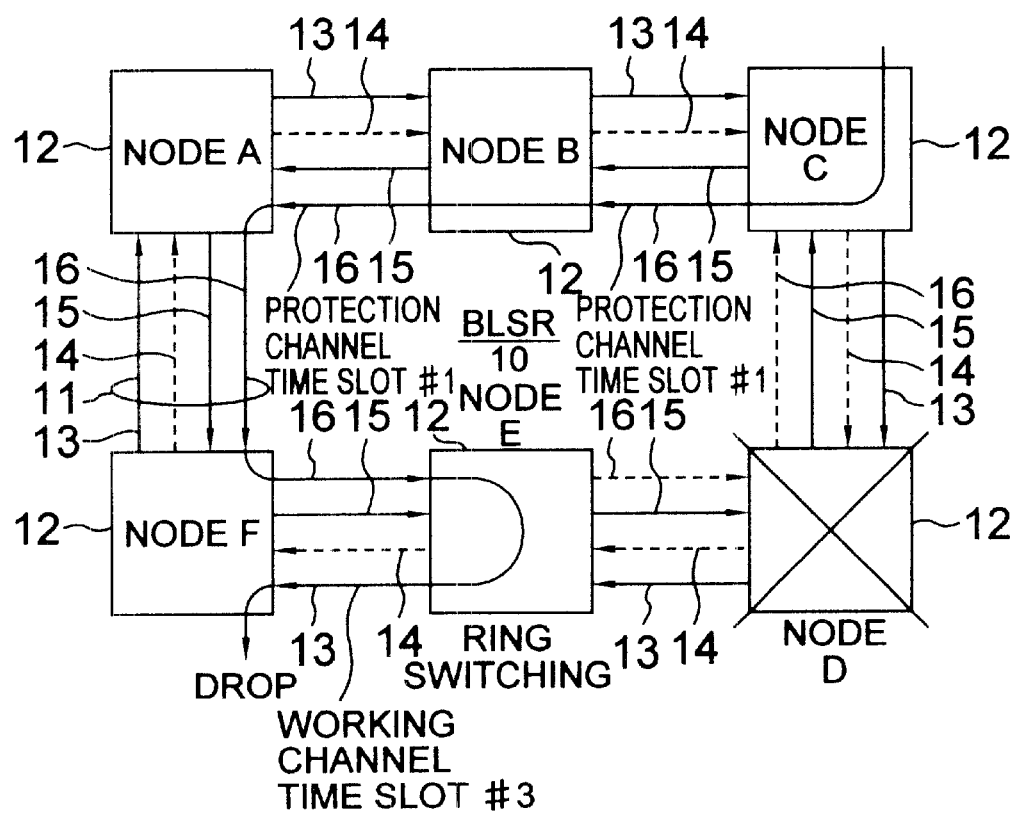
FIG. 17 is a network configuration diagram illustrating an example of the path protection performed by the Ring Switching at the time of a node failure in FIG. 14.

Next, the explanation will be given regarding a method of protecting a path at the time of a node failure. FIG. 17 shows a method of protecting the path illustrated in FIG. 14 at the time when the Ring Switching is executed at the node C and the node E in response to a node failure at the node D.

In FIG. 17, the node C setting up the Ring Switching has becomes a node that loops back the path from the CW direction of working channel 13 to the CCW direction of protection channel 16. By the way, the time slot number #1 is used on the CW direction of working channel 13 in the normal state. Consequently, the node C, by the Time Slot Assignment according to the present invention, loops back the path to the time slot number #1 of the CCW direction of protection channel 16.

Also, the node E has becomes a node that loops back the path on the CCW direction of protection channel 16 to the CW direction of working channel 13. Accordingly, the node E loops back the path from the time slot number #1 on the CCW direction of protection channel 16, to which the path has been looped back at the node C, to the time slot number #3 of the CW direction of working channel 13. Also, the nodes B, A and F, i.e. intermediate nodes other than the nodes C, E that are executing the Ring Switching, are in the Full Pass Through state. What is different between FIG. 16 and FIG. 17 at this time is a point that the time slot number before being looped back from the CCW direction of protection channel 16 is, in FIG. 16, #2 whereas, in FIG. 17, #1. The description will be given later regarding control of the time slot number that is looped back.

Figure 18:
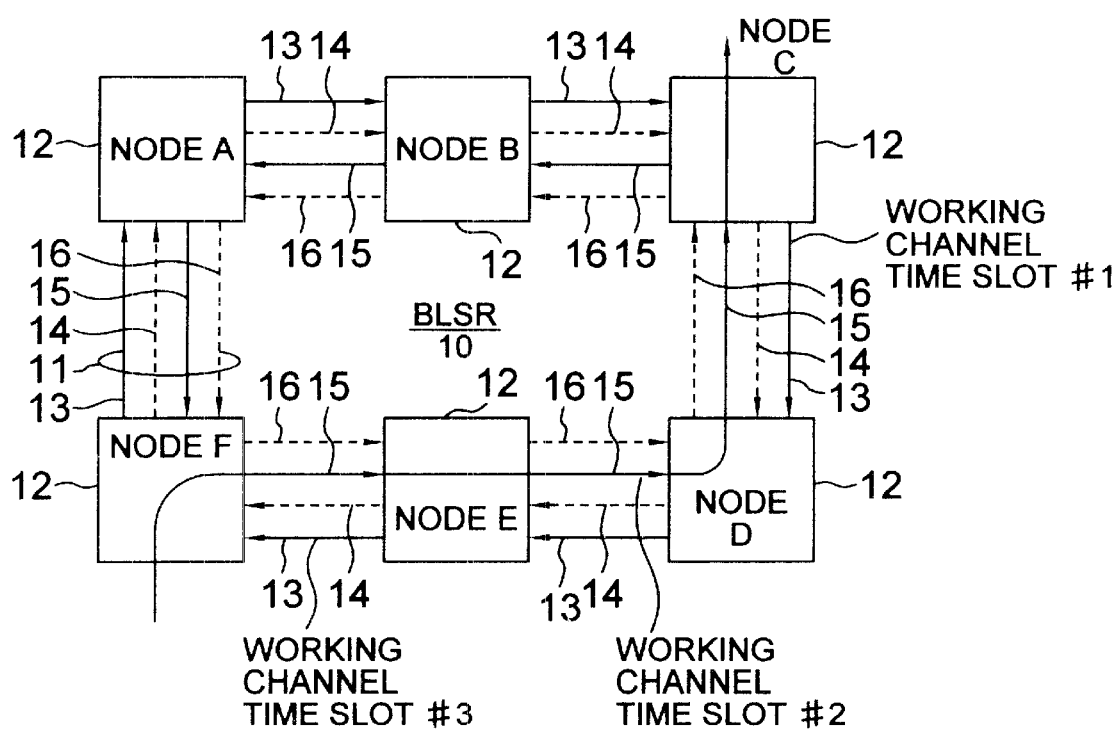
FIG. 18 shows an embodiment of configuration of the 4-Fiber BLSR network system according to the present invention and a network configuration diagram illustrating a second example of the path setting according to the present invention.

FIG. 18 illustrates a corresponding bi-directional path to the path set in FIG. 14. In FIG. 18, a path is added from the node F onto the BLSR, and then is transferred using a CCW direction of working channel 15 and employing the time slot #3 between the node F and the node E, the time slot #2 between the node E and the node D, and the time slot #1 between the node D and the node C, respectively.

Also, in FIG. 18, the time slot number is changed from #3 to #2 at the node E, and the time slot number is changed from #2 to #1 at the node D.

Figure 19:
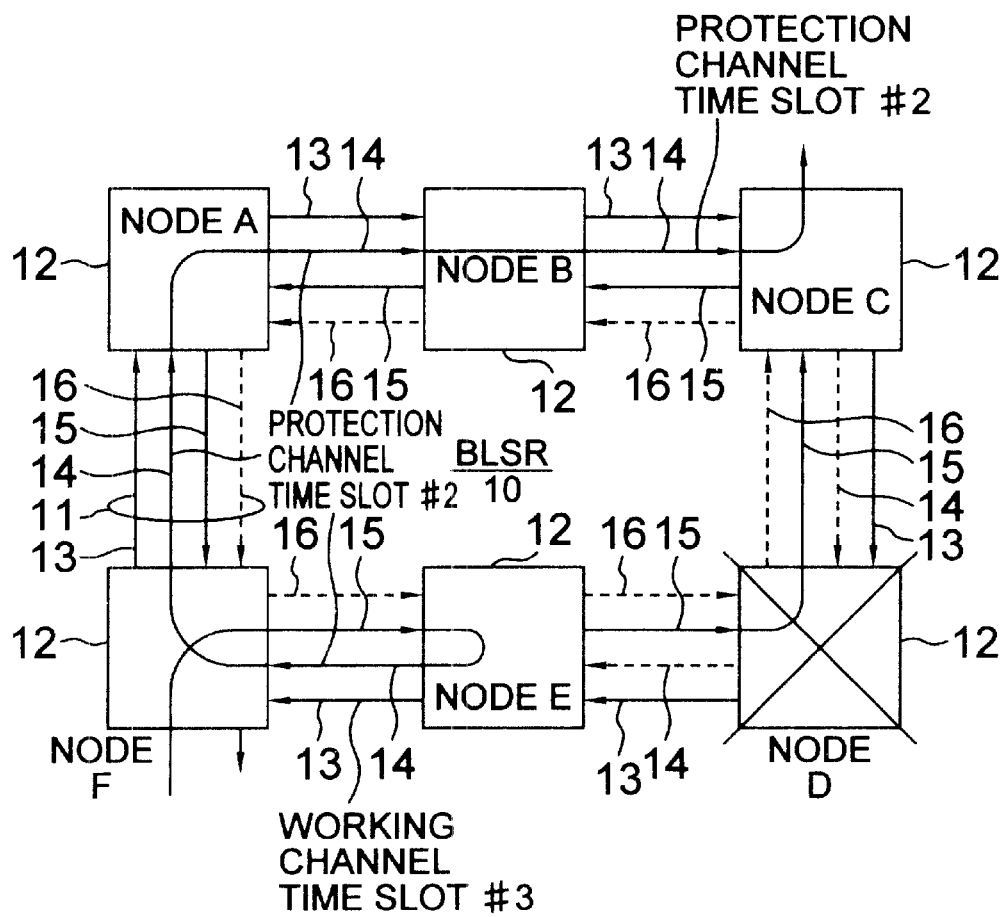
FIG. 19 is a network configuration diagram illustrating an example of the path protection performed by the Ring Switching at the time of a node failure in FIG. 18.

FIG. 19 shows a method of protecting the path set in FIG. 18 at the time when a node failure occurs at the node D. In FIG. 19, the Ring Switching is being set up at the node C and the node E.

In FIG. 19, the node E setting up the Ring Switching is a node that loops back the path from the CCW direction of working channel 15 to the CW direction of protection channel 14. By the way, the time slot number #2 is used on the CCW direction of working channel 15 in the normal state. Consequently, the node E, by the Time Slot Assignment according to the present invention, loops back the path to the time slot number #2 of the CW direction of protection channel 14.

Also, the node C is a node that drops the path on the CW direction of protection channel 14 down to the slow rate-side lower-level network element. Accordingly, the node C drops the path from the time slot number #2 on the CW direction of protection channel 14, to which the path has been looped back at the node E, down to the low rate-side. Also, the nodes B, A and F, i.e. intermediate nodes other than the nodes C, E that are executing the Ring Switching, are in the Full Pass Through state.

As is seen from comparing FIG. 17 with FIG. 19, concerning a bi-directional path, even if states of setting time slot numbers of the two paths between the respective nodes are the same, time slot numbers on the protection channels used for protection of the paths differ at the time of a node failure. For example, in FIG. 17, the protection channel time slot number #1 is used, whereas, in FIG. 19, the protection channel time slot number #2 is used.

Figure 20:
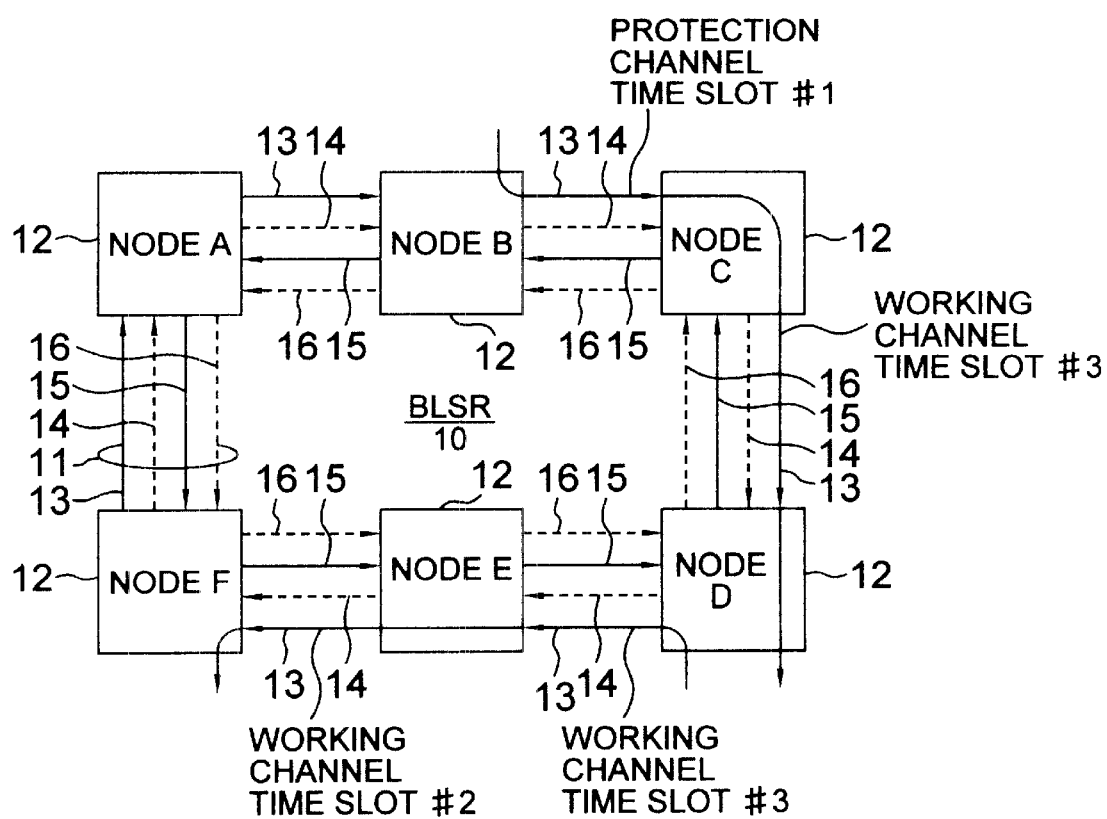
FIG. 20 shows an embodiment of configuration of the 4-Fiber BLSR network system according to the present invention and a network configuration diagram illustrating a third example of the path setting according to the present invention.

Next, the explanation will be given below regarding the Squelch (insertion of the path AIS) at the time of supporting the TSI. FIG. 20 illustrates another example of the channel setting at the time of supporting the TSI in the BLSR. In FIG. 20, a path is added from the node B onto the BLSR, and is transferred using the time slot number #1 of the CW direction of working channel 13 between the node B and the node C and using the time slot number #3 between the node C and the node D, then being dropped at the node D down to the low rate-side (lower-level network element). Also, another path is added from the node D onto the BLSR, and is transferred using the time slot number #3 of the CW direction of working channel 13 between the node D and the node E and using the time slot number #2 between the node E and the node F, then, being dropped at the node F down to the low rate-side (lower-level network element).

Figures 21, 22:
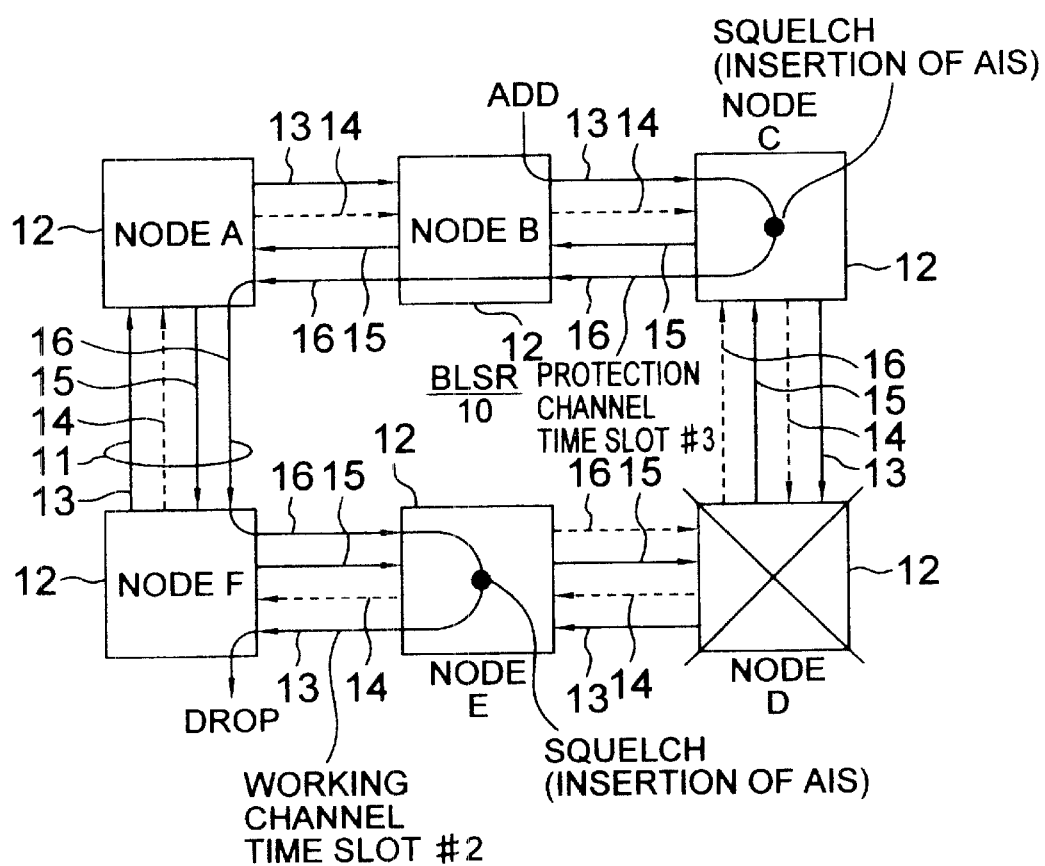
FIG. 21 is a network configuration diagram illustrating an example of the Squelch executed at the time of a node failure in FIG. 20.
FIG. 22 is a path transfer diagram in examples of the path setting illustrated in FIG. 14, FIG. 18 and FIG. 20.

FIG. 21 shows a path transferring diagram of the paths set in FIG. 20 at the time when a node failure occurs at the node D. In FIG. 21, the Ring Switching is being set up at the node C and the node E.

In FIG. 21, the node C is a node that loops back the path from the CW direction of working channel 13 to the CCW direction of protection channel 16. By the way, the time slot number #3 is used on the CW direction of working channel 13 in the normal state. Consequently, the node C loops back the path to the time slot number #3 of the CCW direction of protection channel 16.

However, in FIG. 21, it is impossible to use the path extending from the node B through the node C to the node D because of the node failure of the node D at which the path is dropped down from the BLSR. Accordingly, the path needs to be squelched. Thus, the Squelch is executed at the node C at which the path is looped back, and the path AIS is inserted into the time slot number #3 of the CCW direction of protection channel 16. Also, concerning the path extending from the node D through the node E to the node F, since the node failure occurs at the node D at which the path is added onto the BLSR, the path AIS is inserted into the time slot number #2 of the CW direction of working channel 13 at the node E that is setting up the Ring Switching.

FIG. 22 shows a path transferring diagram of the paths set on the BLSR as illustrated in FIG. 14 and FIG. 20.

Next, the explanation will be given below concerning a method of controlling the time slot at the respective nodes.

First, in the case of the method through the Span Switching or the single Ring Switching, at an instant when the Span Switching or the single Ring Switching is started up, the protection channel is used in a time slot number that is the same as the time slot number used on the working channel in the normal state.

At the node D at which the Span Switching is being executed in FIG. 15, the assignment of the time slot number to the outputting CW direction of working channel 13 is applied, without any change, to the outputting CW direction of protection channel 14, and at the node E as well, the assignment of the time slot number to the inputted CW direction of working channel 13 is applied, without any change, to the inputted CW direction of protection channel 14. This procedure makes it possible to connect the paths in such a manner as 33 indicated in FIG. 13.

In the case in FIG. 16 in which the single Ring Switching is started up, too, at the nodes D, E at which the Ring Switching is started up, the assignment of the time slot number to the CW direction of working channel 13 is applied, without any change, to the CCW direction of protection channel 16. This procedure makes it possible to connect the paths in such a manner as illustrated in FIG. 16.

However, an occurrence of the node failure or segmentation of the Ring complicates the method of controlling the time slot. For example, in FIG. 17, the node C performs the operation of looping back the path to the time slot number #1 of the CCW direction of protection channel 16, and the node E performs the operation of looping back the path from the time slot number #1 of the CCW direction of protection channel to the time slot number #3 of the CW direction of working channel. Also, in some cases, the Squelch processing as illustrated in FIG. 21 becomes necessary.

In order to execute the controls of the time slots like these, TSI tables, which are obtained by extending the STS Squelch Maps in FIG. 10, are used. A TSI table is a table for indicating which of the time slot numbers a path, which is transmitted and received at the node, uses while the path is being transferred between the respective nodes.

FIG. 23A to FIG. 28B show the TSI table that each of the nodes A, B, C, D, E and F holds when the paths are set as indicated in FIG. 22. Since the respective tables are of the same meaning, the explanation will be given below regarding, as a representative, a TSI table at the node C which is shown in FIGS. 25A and 25B.

Concerning transmitting (Outgoing) time slots and receiving (Incoming) time slots for each of the directions of a node, i.e. a West-direction (A) and an East-direction (B), a TSI table indicates which of the time slot numbers a path contained therein uses and to what node the path has been transferred on the BLSR. A reference note "-" indicates that there exists no path between the corresponding nodes In the TSI table at the node C which is shown in FIG. 25, a West-direction receiving (Incoming) time slot in FIG. 25A, i.e. a receiving time slot #1 between the node C and the node B, indicates that the path is transferred using the time slot number #1 between the node C and the node B. Moreover, there exists no path between the node B and the node A, which shows that the path has been added onto the BLSR at the node B.

Also, an East-direction transmitting (Outgoing) time slot, i.e. a transmitting time slot #1 between the node C and the node D indicates the following: The path is transferred using the time slot number #1 between the node C and the node D, a time slot number #2 between the node D and the node E, and a time slot number #3 between the node E and the node F, respectively, and then the path has been dropped down from the BLSR at the node F.

Also, a time slot #3 indicates that the path is transferred using the time slot number #3 between the node C and the node D, then being dropped down at the node D. Similarly, an East-direction receiving time slot #1 indicates the followings: The path has been added onto the BLSR at the node F, and is transferred using a time slot number #3 between the node E and the node F, a time slot number #2 between" the node D and the node E, and the time slot number #1 between the node C and the node D, respectively.

Figure 29:
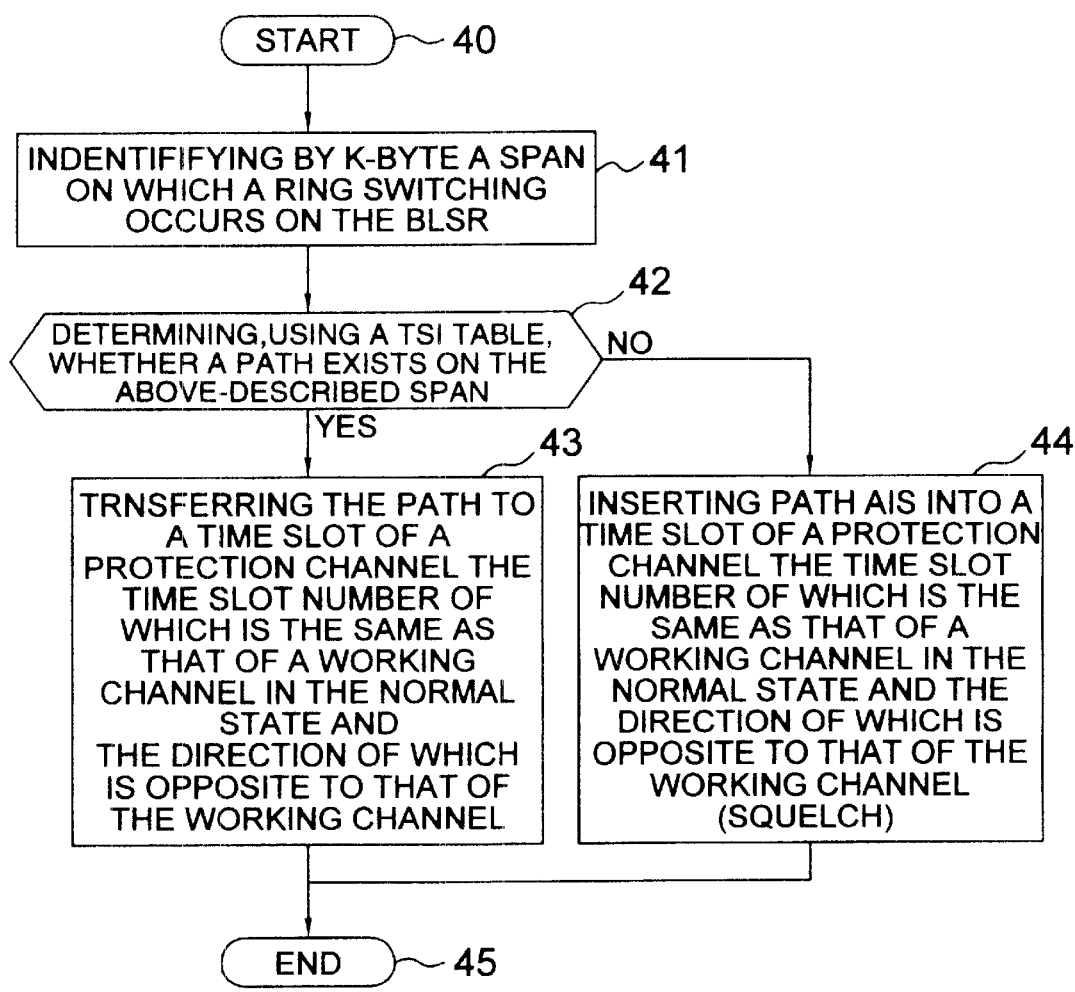
FIG. 29 is a flow chart showing a Time Slot Assignment operation from a working channel to a protection channel according to the present invention.

FIG. 29 shows an example of a flow chart at the time when a path is looped back from a working channel to a protection channel by the Ring Switching. The description will be given regarding, as examples, operations of the node C in, FIG. 17 and FIG. 21.

In the BLSR, the K-byte on the Line Overhead allows a Missing Node to be identified. Accordingly, the K-byte also makes it possible to identify a span on which the Ring Switching is being executed. In the cases illustrated in FIG. 17 and FIG. 21, the Missing Node is the node D. Consequently, it is possible to identify a fact that the Ring Switching is being executed on a span adjacent to the node D, i.e. the span between the node D and the node E (step 41).

Next, based on the TSI table, it is determined whether or not there exists a path on the span identified at the step 41 (step 42). According to FIG. 25B, since the path 30 of the time slot number #1 of the East-direction Outgoing path uses the time slot number #2 between the node D and the node E, there exists a path on the span.

Accordingly, at a step 43, as is illustrated in FIG. 17, the path is looped back to the time slot number #1 of the CCW direction of protection channel. Regarding the path 31 of the time slot number #3 of the East-direction Outgoing path, there exists no path between the node D and the node E. Consequently, at a step 44, as is illustrated in FIG. 21, the path AIS is inserted into the time slot number #3 of the CCW direction of protection channel.

Figure 30:
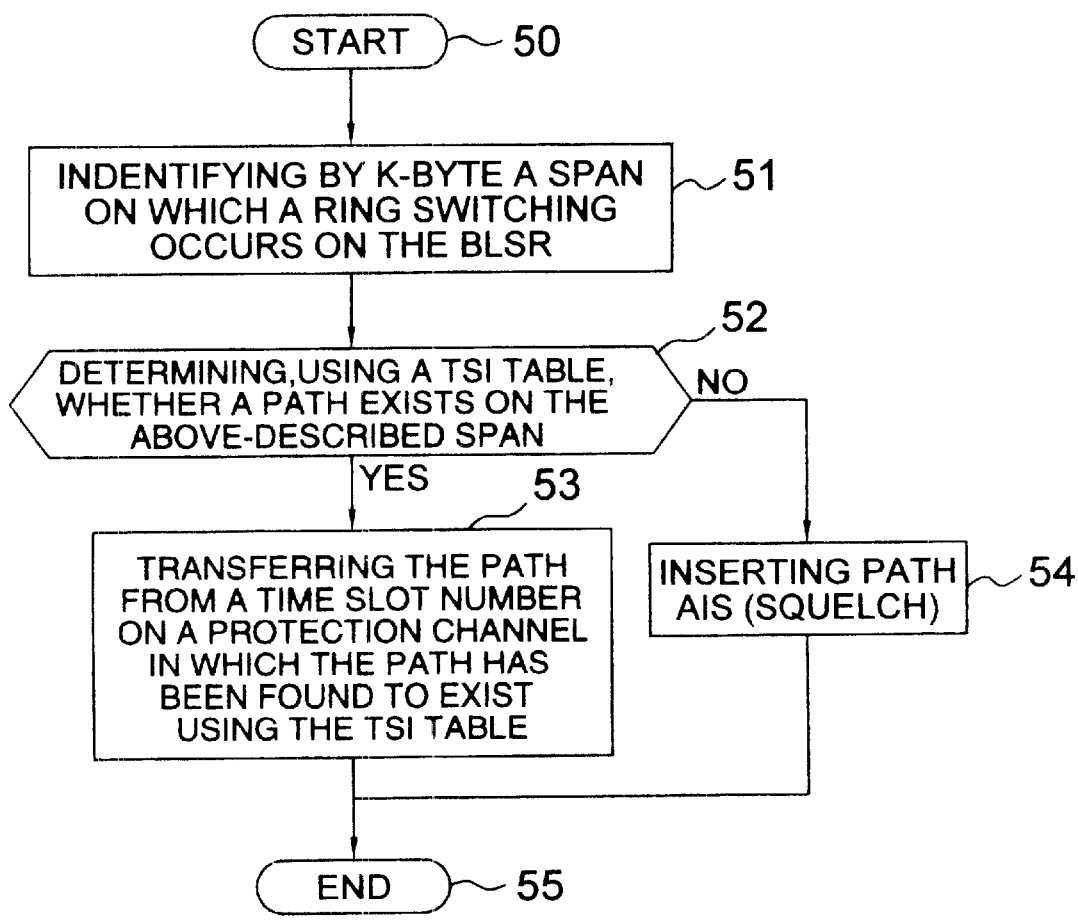
FIG. 30 is a flow chart showing a Time Slot Assignment operation from a protection channel to a working channel or a lower-level network element according to the present invention.

FIG. 30 shows an example of a flow chart at the time when a path is looped back from a protection channel to a working channel or a lower-level network element by the Ring Switching. The description will be given regarding, as examples, operations of the node E in FIG. 17 and FIG. 21.

First, a span on which the Ring Switching is being executed is identified by the K-byte (step 51). In the cases illustrated in FIG. 17 and FIG. 21, the Missing Node is the node D. Consequently, it is possible to identify, by the K-byte, a fact that the Ring Switching is being executed on a span adjacent to the node D, i.e. the span between the node D and the node C.

Next, based on the TSI table, it is determined whether or not there exists a path on the span identified at the step 51 (step 52). According to FIG. 27A, since a path 33 of a time slot number #2 of a West-direction Incoming path uses the time slot number #2 between the node D and the node E, there exists a path on the span.

Accordingly, at a step 53, the path is looped back from the time slot number #1 of the CCW direction of protection channel 16. The path looped back is a path of the West-direction receiving time slot number #2 of the CW direction of working channel 13, and thus the path is connected with the East-direction transmitting time slot number #3.

Also, regarding a path 34 of a time slot number #3 of the West-direction Incoming path, there exists no path between the node D and the node C. Consequently, at a step 54, as is illustrated in FIG. 21, the Squelch is executed and the path AIS is inserted into the time slot number #2 of the CW direction of working channel 13, i.e. a destination with which the path is connected.

Figure 31:
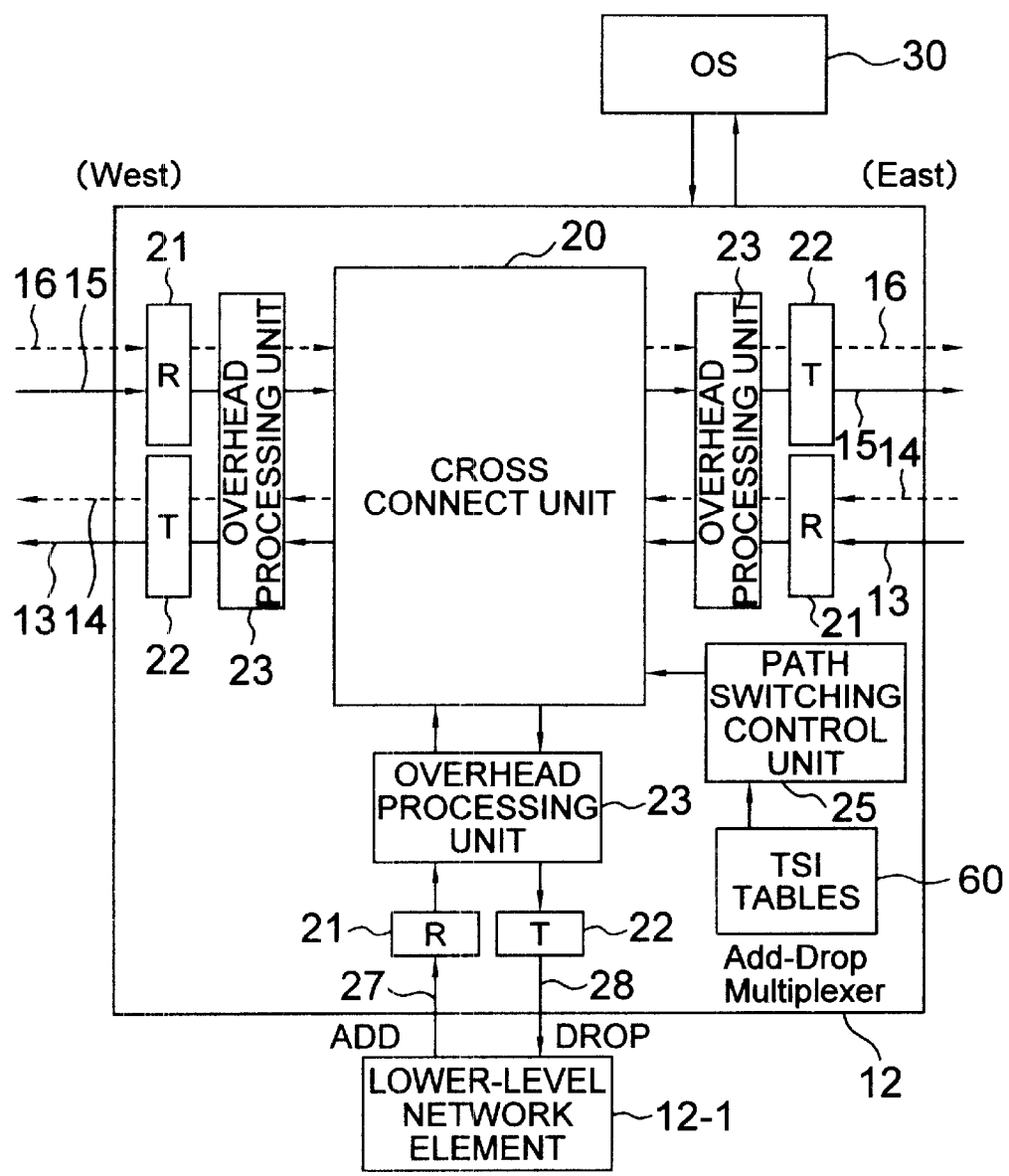
FIG. 31 is a block diagram illustrating a configuration of a node according to the embodiment of the present invention that has the TSI tables described in FIG. 23A to FIG. 28B.

FIG. 31 is a block diagram illustrating an inner configuration of a node in the BLSR network system according to the embodiment of the present invention. The same reference numerals as those in FIG. 4 denote the same components. A path switching unit 25 is a computer that executes programs shown in the flow charts in FIG. 29 and FIG. 30. The path switching unit 25 is connected with a memory in which TSI tables 60 are stored. The TSI tables 60 are shown in FIGS. 23A to 28B.

When a path passes through a node illustrated in FIG. 31, the path switching control unit 25 refers to the TSI tables 60 and sets a time slot number of the path in being inputted into the node and a time slot number of the path in being outputted from the node independently of each other.

When a failure occurs on one of working transmission lines between adjacent nodes (span), the path switching control unit 25 refers to the TSI tables 60 and executes a span switching that allows a path to be maintained by using a protection transmission line the time slot number of which is the same as a time slot number of the working transmission line.

Further, when failures occur on all of transmission lines between adjacent nodes, the path switching control unit 25 refers to the TSI tables 60 and executes a ring switching that allows a path to be maintained by using a protection transmission line which is provided with the same time slot number as that of a working transmission line between the adjacent nodes and the direction of which is opposite to a direction of the working transmission line.

Still further, when a failure occurs at one node, the path switching control unit 25 refers to the TSI tables 60 and executes, at the other node connected with the failed node, a ring switching that allows a path to be transferred from a working transmission line or an external communications apparatus to a protection transmission line, and by the ring switching, transfers the path to a protection transmission line which is provided with the same time slot number as a time slot number of a working transmission line between the connected nodes before the failure and the direction of which is opposite to a direction of the working transmission line, and executes, at the other node connected with the failed node, a ring switching that allows a path to be transferred from a protection transmission line to a working transmission line or an external communications apparatus, and by the ring switching, transfers the path with the time slot number of the protection transmission line.

In the above-described embodiment, the 4-Fiber BLSR has been taken as the example. The present invention, however, is applicable to the 2-Fiber BLSR as well. In the 2-Fiber BLSR, a half of the entire band is assigned to a working function and the remaining half is assigned to a protecting function. Consequently, assuming that the band assigned to the working function is a working channel and the band assigned to the protecting function is a protection channel, the present invention is applicable to, the 2-Fiber BLSR.

As described above, the present invention makes it possible to perform the TSI of a path passing through the high rate-side on the BLSR, thus allowing a limited band of a transmission line to be used effectively.

Also, the present invention makes it possible to carry out protection of a path even when an occurrence of a failure or an instruction from the OS causes a switching to take place. Moreover, even at the time of a node failure or when a segmentation of the Ring is performed, the present invention enables connection of the path to be executed suitably using the TSI tables proposed. Furthermore, even in the case of being associated with the Squelch, the present invention makes it possible to insert the path AIS.

What is claimed is:

1. A bi-directional line switched ring network system, comprising:

a plurality of optical fiber communications lines, a plurality of nodes connected by said plurality of optical fiber communications lines in such a manner as to form a closed circuit, each of said plurality of nodes performing an addition and a drop of a path between an external communications apparatus and said optical fiber communications lines, or permitting said path on said optical fiber communications lines to pass through, or performing a change of a direction of said path, and a control unit located in each of said plurality of nodes so as to control the addition, the drop, the pass-through and the direction change of said path, wherein when said path passes through each of said plurality of nodes, said control unit sets a time slot number of said path in being inputted into said node and a time slot number of said path in being outputted from said node independently of each other.

2. A bi-directional line switched ring network system as claimed in claim 1, wherein said control unit in each of said plurality of nodes has a time slot interchange table in which, concerning each of said plurality of nodes, time slot numbers of transmission lines between all adjacent nodes, to which said path inputted into said each node is transferred, are described in an order of being transferred from, to start with, a node at which said path is added and in which time slot numbers of transmission lines between all adjacent nodes, to which said path outputted from said each node is transferred, are described in an order of being transferred from, to start with, said each node from which said path is outputted to a node at which said path is dropped.

3. A bi-directional line switched ring network system, comprising:

a plurality of optical fiber communications lines, a plurality of nodes connected by said plurality of optical fiber communications lines in such a manner as to form a closed circuit, each of said plurality of nodes performing an addition and a drop of a path between an external communications apparatus and said optical fiber communications lines, or permitting said path on said optical fiber communications lines to pass through, or performing a change of a direction of said path, and a control unit located in each of said plurality of nodes so as to control the addition, the drop, the pass-through and the direction change of said path, wherein when a span switching is executed between adjacent nodes, said control unit in each of said adjacent nodes maintains said path by using a protection transmission line the time slot number of which is the same as a time slot number of a working transmission line between said adjacent nodes, wherein when the path passes through each node, the control unit setting a time slot number of the path being inputted into a node and a time slot number of the path being outputted from the node independently of each other.

4. The bi-directional line switched ring network system as claimed in claim 3, wherein said control unit in each of said plurality of nodes has a time slot interchange table in which, concerning each of said plurality of nodes, time slot numbers of transmission lines between all adjacent nodes, to which said path inputted into said each node is transferred, are described in an order of being transferred from, to start with, a node at which said path is added and in which time slot numbers of transmission lines between all adjacent nodes, to which said path outputted from said each node is transferred, are described in an order of being transferred from, to start with, said each node from which said path is outputted to a node at which said path is dropped, and by referring to said time slot interchange table, said control unit determines a time slot number of said path at the time when said span switching is executed.

5. A bi-directional line switched ring network system, comprising:
a plurality of optical fiber communications lines,
a plurality of nodes connected by said plurality of optical fiber communications lines in such a manner as to form a closed circuit, each of said plurality of nodes performing an addition and a drop of a path between an external communications apparatus and said optical fiber communications lines, or permitting said path on said optical fiber communications lines to pass through, or performing a change of a direction of said path, and
a control unit located in each of said plurality of nodes so as to control the addition, the drop, the pass-through and the direction change of said path, wherein when a ring switching is executed between adjacent nodes, said control unit in each of said adjacent nodes maintains said path by using a protection transmission line which is provided with the same time slot number as a time slot number of a working transmission line between said adjacent nodes and the direction of which is opposite to a direction of said working transmission line, wherein when the path passes through each node, the control unit setting a time slot number of the path being inputted into a node and a time slot number of the path being outputted from the node independently of each other.

6. The bi-directional line switched ring network system as claimed in claim 5, wherein said control unit in each of said plurality of nodes has a time slot interchange table in which, concerning each of said plurality of nodes, time slot numbers of transmission lines between all adjacent nodes, to which said path inputted into said each node is transferred, are described in an order of being transferred from, to start with, a node at which said path is added and in which time slot numbers of transmission lines between all adjacent nodes, to which said path outputted from said each node is transferred, are described in an order of being transferred from, to start with, said each node from which said path is outputted to a node at which said path is dropped, and by referring to said time slot interchange table, said control unit determines a time slot number of said path with which said ring switching is executed.

7. A bi-directional line switched ring, comprising:
a plurality of optical fiber communications lines,
a plurality of nodes connected by said plurality of optical fiber communications lines in such a manner as to form a closed circuit, each of said plurality of nodes performing an addition and a drop of a path between an external communications apparatus and said optical fiber communications lines, or permitting said path on said optical fiber communications lines to pass through, or performing a change of a direction of said path, and
a control unit located in each of said, plurality of nodes so as to control the addition, the drop, the pass-through and the direction change of said path,
wherein when ring switching is executed between two or more of adjacent nodes,
said control unit in each of one of said adjacent nodes, which executes a ring switching for allowing a path to be transferred from a working transmission line or an external communications apparatus to a protection transmission line, transfers said path to a protection transmission line which is provided with the same time slot number as a time slot number of a working transmission line between the one of said adjacent nodes and the direction of which is opposite to a direction of said working transmission line, and
said control unit in each of the other one of said adjacent nodes, which executes a ring switching for allowing a path to be transferred from a protection transmission line to a working transmission line or an external communications apparatus, transfers said path with the time slot number of said protection transmission line, wherein when the path passes through each node, the control unit setting a time slot number of the path being inputted into a node and a time slot number of the path being outputted from the node independently of each other.

8. The bi-directional line switched ring network system as claimed in claim 7, wherein said control unit in each of said plurality of nodes has a time slot interchange table in which, concerning each of said plurality of nodes, time slot numbers of transmission lines between all adjacent nodes, to which said path inputted into said each node is transferred, are described in an order of being transferred from, to start with, a node at which said path is added and in which time slot numbers of transmission lines between all adjacent nodes, to which said path outputted from said each node is transferred, are described in an order of being transferred from, to start with, said each node from which said path is outputted to a node at which said path is dropped, and by referring to said time slot interchange table, said control unit determines a time slot number of said path with which said ring switching is executed.

9. A method of protecting a path in a bi-directional line switched ring network system having a plurality of nodes connected by a plurality of optical fiber communications lines in such a manner as to form a closed circuit, comprising the steps of:
setting, when a path passes through each of said plurality of nodes, a time slot number of said path in being inputted into said each node and a time slot number of said path in being outputted from said each node independently of each other, and, when there occurs a failure on one of working transmission lines between adjacent nodes,
executing a span switching that allows said path to be maintained by using a protection transmission line the time slot number of which is the same as a time slot number of said one of working transmission lines.

10. A method of protecting a path in a bi-directional line switched ring network system having a plurality of nodes connected by a plurality of optical fiber communications lines in such a manner as to form a closed circuit, comprising the steps of:

setting, when a path passes through each of said plurality of nodes, a time slot number of said path in being inputted into said each node and a time slot number of said path in being outputted from said each node independently of each other, and, when there occur failures on all of transmission lines between adjacent nodes, executing a ring switching that allows said path to be maintained by using a protection transmission line which is provided with the same time slot number as a time slot number of a working transmission line between said adjacent nodes and the direction of which is opposite to a direction of said working transmission line.

11. A method of protecting a path in a bi-directional line switched ring network system having a plurality of nodes connected by a plurality of optical fiber communications lines in such a manner as to form a closed circuit, comprising the steps of:

setting, when a path passes through each of said plurality of nodes, a time slot number of said path in being inputted into said each node and a time slot number of said path in being outputted from said each node independently of each other, and, when there occurs a failure at one node, executing, at the other node connected with said filed node, a ring switching for allowing a path to be transferred from a working transmission line or an external communications apparatus to a protection transmission line, and by means of said ring switching, transferring said path to a protection transmission line which is provided with the same time slot number as a time slot number of a working transmission lien between said connected nodes before said failure and the direction of which is opposite to a direction of said working transmission line, executing, at the other node connected with said failed node, a ring switching for allowing a path to be transferred from a protection transmission line to a working transmission line or an external communications apparatus, and by means of said ring switching, and transferring said path with the time slot number of said protection transmission line.

12. A bi-directional line switched ring network system, comprising:

a plurality of nodes connected by a plurality of first communications lines in such a manner as to form a closed circuit, each of said plurality of nodes performing an addition and a drop of a path between an external communications apparatus connected with a plurality of second communications lines and said first communications lines, or permitting said path from said first communications lines to pass through, or performing a change of a direction of said path to said first communications lines, and a control unit located in each of said plurality of nodes so as to control addition and drop of said path between said external communications apparatus and said first communications lines, to control pass-through of the path from said first communications lines, or to control direction change of said path to said first communications lines, wherein when said path inputted from said first communication lines passes through each of said plurality of nodes and is outputted from said first communications lines, said control unit sets a time slot number of said path in being inputted into said node and a time slot number of said path in being outputted from said node independently of each other.

13. A bi-directional line switched ring network system as claimed in claim 12, wherein said control unit in each of said plurality of nodes has a time slot interchange table in which, concerning each of said plurality of nodes, time slot numbers of transmission lines between all adjacent nodes, to which said path inputted into said each node is transferred, are described in an order of being transferred from, to start with, a node at which said path is added and in which time slot numbers of transmission lines between all adjacent nodes, to which said path outputted from said each node is transferred, are described in an order of being transferred from, to start with, said each node from which said path is outputted to a node at which said path is dropped.

14. A bi-directional line switched ring network system, comprising:

a plurality of optical fiber communications lines, a plurality of nodes connected by a plurality of first communications lines in such a manner as to form a closed circuit, each of said plurality of nodes performing an addition and a drop of a path between an external communications apparatus connected with a plurality of second communications lines and said first communications lines to pass through, or performing a change of a direction of said path to said first communications lines, and a control unit located in each of said plurality of nodes so as to control the addition and the drop of the path between said external communications apparatus and said first communications lines, the pass-through from said first communications lines and the direction change of said path to said first communications lines, wherein when a span switching is executed between adjacent nodes, said control unit in each of said adjacent nodes maintains said path by using a protection transmission line the time slot number of which is the same as a time slot number of a working transmission line between said adjacent nodes, and said control unit sets a time slot number of said path in being inputted into said node and a time slot number of said path in being outputted from said node independently of each other.

15. The bi-directional line switched ring network system as claimed in claim 14, wherein said control unit in each of said plurality of nodes has a time slot interchange table in which, concerning each of said plurality of nodes, time slot numbers of said first communications lines between all adjacent nodes, to which said path inputted into said each node is transferred, are described in an order of being transferred from, to start with, a node at which said path is added and in which time slot numbers of said first communications lines between all adjacent nodes, to which said path outputted from said each node is transferred, are described in an order of being transferred from, to start with, said each node from which said path is outputted to a node at which said path is, dropped, and by referring to said time slot interchange table, said control unit determines a time slot number of said path at the time when said span switching is executed.

16. A bi-directional line switched ring network system, comprising:
   a plurality of nodes connected by said plurality of first communications lines in such a manner as to form a closed circuit, each of said plurality of nodes performing an addition and a drop of a path between an external communications apparatus connected with a plurality of second communications lines and said first communications lines, or permitting said path from said first communications lines to pass through, or performing a change of a direction of said path from to said first communications lines, and
   a control unit located in each of said plurality of nodes so as to control the addition and the drop of the path between said external communications apparatus and said first communications lines, the pass-through of the path from said first communications lines and the direction change of said path to said first communications lines, wherein when a ring switching is executed between adjacent nodes, said control unit in each of said adjacent nodes maintains said path by using a protection transmission line which is provided with the same time slot number as a time slot number of a working transmission line between said adjacent nodes and the direction of which is opposite to a direction of said working transmission line, and when the path inputted at the first communications lines passes through said node and is outputted at said first communications lines said control unit sets a time slot number of said path in being inputted into said node and a time slot number of said path is being outputted from said node independently of each other.

17. The bi-directional line switched ring network system as claimed in claim 16, wherein said control unit in each of said plurality of nodes has a time slot interchange table in which, concerning each of said plurality of nodes, time slot numbers of said first communications lines between all adjacent nodes, to which said path inputted into said each node is transferred, are described in an order of being transferred from, to start with, a node at which said path is added and in which time slot numbers of said first communications lines between all adjacent nodes, to which said path outputted from said each node is transferred, are described in an order of being transferred from, to start with, said each node from which said path is outputted to a node at which said path is dropped, and by referring to said time slot interchange table, said control unit determines a time slot number of said path with which said ring switching is executed.

18. A bi-directional line switched ring network system comprising:
   a plurality of nodes connected by a plurality of first communications lines in such a manner as to form a closed circuit, each of said plurality of nodes performing an addition and a drop of a path between an external communications apparatus connected with a plurality of second communications lines and said first communications lines, or permitting said path on said first communications lines to pas through, or performing a change of a direction of said path to said first communications lines, and
   a control unit located in each of said plurality of nodes so as to control the addition and the drop of the path between said external communications apparatus and said first communications lines, the pass-through of the path from said first communications lines and the direction change of said path to said first communications lines, wherein when ring switching is executed between two or more of adjacent nodes,
   said first communications lines include a working transmission lien and a protection transmission line,
   said control unit in each of said adjacent nodes, which executes a ring switching for allowing a path to be transferred from said working transmission line or an external communications apparatus to said protection transmission line, transfers said path to a protection transmission line which is provided with the same time slot number as a time slot number of a working transmission line between the one of said adjacent nodes and the direction of which is opposite to a direction of said working transmission line, and
   said control unit in each of the other one of said adjacent nodes, which executes a ring switching for allowing a path to be transferred from a protection transmission lien to a working transmission lie or an external communications apparatus, transfers said path with the time slot number of said protection transmission line.

19. The bi-directional line switched ring network system as claimed in claim 18, wherein said control unit in each of said plurality of nodes has a time slot interchange table in which, concerning each of said plurality of nodes, time slot numbers of said first communications lines between all adjacent nodes, to which said path inputted into said each node is transferred, are described in an order of being transferred from, to start with, a node at which said path is added and in which time slot numbers of said first communications lines between all adjacent nodes, to which said path outputted from said each node is transferred, are described in an order of being transferred from, to start with, said each node from which said path is outputted to a node at which said path is dropped, and by referring to said time slot interchange table, said control unit determines a time slot number of said path with which said ring switching is executed.

20. A method of protecting a path in a bi-directional line switched ring network system having a plurality of nodes connected by a plurality of first communications lines including a working transmission line and a protection transmission line in such a manner as to form a closed circuit, comprising the steps of:
   setting, when a path from said first communications lines passes through each of said plurality of nodes and is outputted at said first communications lines passes through each of said plurality of nodes and is outputted at said fist communications lines, a time slot number of said path in being inputted into said each node and a time slot number of said path in being outputted from said each node independently of each other, and, when there occurs a failure on one of working transmission lines between adjacent nodes,
   executing a span switching that allows said path to be maintained by using a protection transmission line the time slot number of which is the same as a time slot number of said one of working transmission lines.

21. A method of protecting a path in a bi-directional line switched ring network system having a plurality of nodes connected by a plurality of first communications lines including a working transmission line and a protection transmission line in such a manner as to form a closed circuit, comprising the step of:
   setting, when a path from said first communications lines passes through each of said plurality of nodes and is outputted at said first communications lines, a time slot number of said path in being inputted into said each node and a time slot number of said path in being outputted from said each node independently of each other, and, when there occur failures on all of transmission lines between adjacent nodes, executing a ring switching that allows said path to be maintained by using a protection transmission line which is provided with the same time slot number as a time slot number of a working transmission lien between said adjacent nodes and the direction of which is opposite to a direction of said working transmission line.

22. A method of protecting a path in a bi-directional line switched ring network system having a plurality of nodes connected by a plurality of first communications lines including a working transmission line and a protection transmission line in such a manner as to form a closed circuit, comprising the steps of:

setting, when a path from said first communications lines passes through each of said plurality of nodes and is outputted at said first communications lines, a time slot number of said path in being inputted into said each node and a time slot number of said path in being outputted from aid each node independently of each other, and, wherein there occurs a failure at one node, executing, at the other node connected with said failed node, a ring switching for allowing a path to be transferred from a working transmission line or an external communications apparatus connected by a second communication lien to a protection transmission lien, and by means of said ring switching, transmission line which is provided with the same time slot number as a time slot number of a working transmission line between said connected nodes before said failure and the direction of which is opposite to a direction of said working transmission line, executing, at the other node connected with said failed node, a ring switching for allowing a path to be transferred from a protection transmission line to the working transmission line or the external communications apparatus, and by means of said ring switching, and transferring said path with the time slot number of said protection transmission line.

* * * * *